(12) United States Patent
Kai

(10) Patent No.: US 10,178,510 B1
(45) Date of Patent: Jan. 8, 2019

(54) SYSTEM AND METHOD FOR LOCATING A COMMUNICATION DEVICE

(71) Applicant: Wissam Elias Kai, Dubai (AE)

(72) Inventor: Wissam Elias Kai, Dubai (AE)

(*) Notice: Subject to any disclaimer, the term of this patent is extended or adjusted under 35 U.S.C. 154(b) by 0 days.

(21) Appl. No.: 16/044,212

(22) Filed: Jul. 24, 2018

Related U.S. Application Data

(60) Provisional application No. 62/633,043, filed on Feb. 20, 2018.

(51) Int. Cl.
| | |
|---|---|
| H04W 24/00 | (2009.01) |
| H04W 4/029 | (2018.01) |
| H04W 4/02 | (2018.01) |
| H04W 64/00 | (2009.01) |
| H04W 4/80 | (2018.01) |
| G01S 19/42 | (2010.01) |
| H04M 1/725 | (2006.01) |
| H04W 88/02 | (2009.01) |

(52) U.S. Cl.
CPC ........... *H04W 4/029* (2018.02); *H04W 4/023* (2013.01); *H04W 4/025* (2013.01); *H04W 4/80* (2018.02); *H04W 64/003* (2013.01); *G01S 19/42* (2013.01); *H04M 1/72519* (2013.01); *H04M 1/72522* (2013.01); *H04W 88/02* (2013.01)

(58) Field of Classification Search
CPC ....... H04W 4/029; H04W 4/80; H04W 4/023; H04W 4/025; H04W 64/003; G01S 19/42; H04M 1/72519; H04M 1/72522
USPC .............................. 455/456.1, 456.5, 550.1
See application file for complete search history.

(56) References Cited

U.S. PATENT DOCUMENTS

| | | | | |
|---|---|---|---|---|
| 9,305,020 | B2* | 4/2016 | Jacoby | G06F 17/30241 |
| 2014/0164519 | A1* | 6/2014 | Shah | H04L 67/306 |
| | | | | 709/204 |
| 2014/0303980 | A1* | 10/2014 | Sethi | A61B 5/4803 |
| | | | | 704/270 |
| 2015/0087328 | A1* | 3/2015 | Chao | H04W 64/00 |
| | | | | 455/456.1 |
| 2016/0005003 | A1* | 1/2016 | Norris | G06Q 10/10 |
| | | | | 705/7.19 |
| 2016/0057565 | A1* | 2/2016 | Gold | H04L 67/12 |
| | | | | 455/41.1 |
| 2016/0294957 | A1* | 10/2016 | Samant | H04W 4/029 |
| 2017/0080332 | A1* | 3/2017 | Poisner | G06F 3/017 |
| 2017/0269073 | A1* | 9/2017 | Samant | G01N 33/538 |
| 2018/0128896 | A1* | 5/2018 | Kim | G01S 5/0072 |

* cited by examiner

*Primary Examiner* — Danh C Le
(74) *Attorney, Agent, or Firm* — Michael D. Eisenberg

(57) ABSTRACT

A plurality of communication devices are configured for communicating with the server via the internet. Each communication device is configured for communicating with other communication devices, via short range signals. At least a property of the received short range signals is measured and converted to signal data. Each communication device is associated with a user, and each user is associated with respective user data stored. Location data of at least a first communication device is known at a first time. When a second communication device is inside the communication ranges of two or more first communication devices with known respective locations, the server processes the known locations to yield a location of the second communication device.

11 Claims, 24 Drawing Sheets

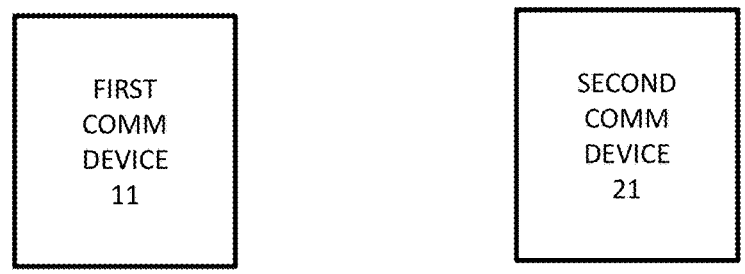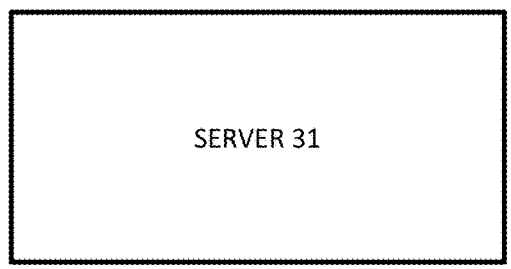
Fig. 1

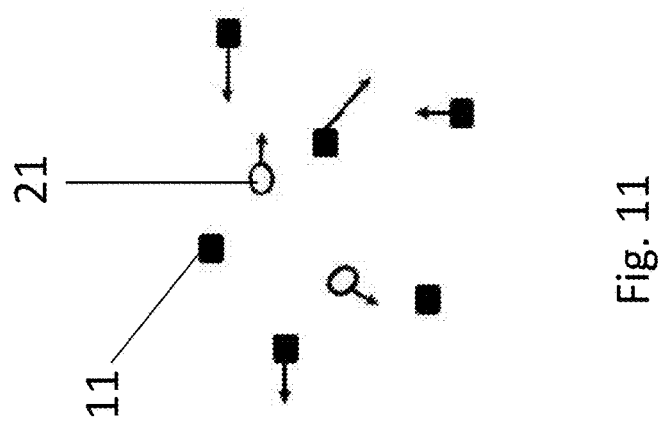
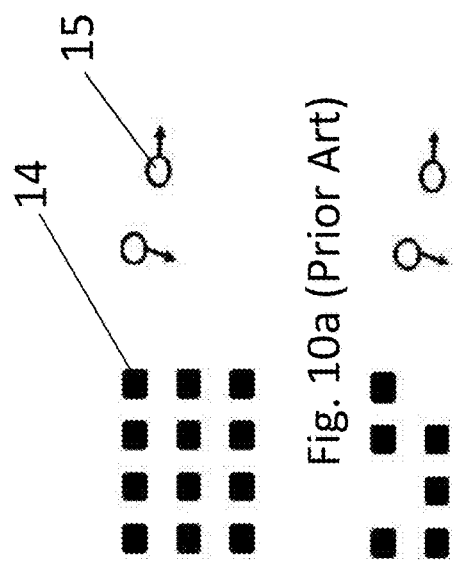
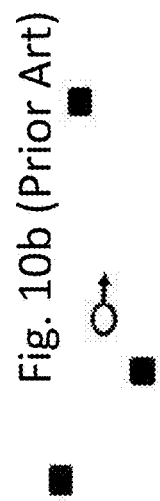
Fig. 10a (Prior Art)
Fig. 10b (Prior Art)
Fig. 10c (Prior Art)
Fig. 11

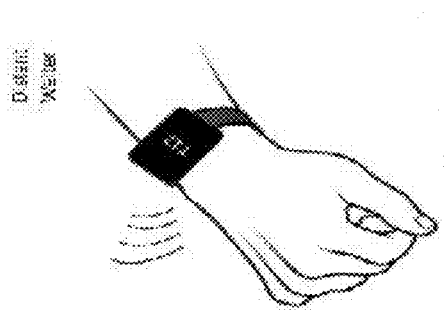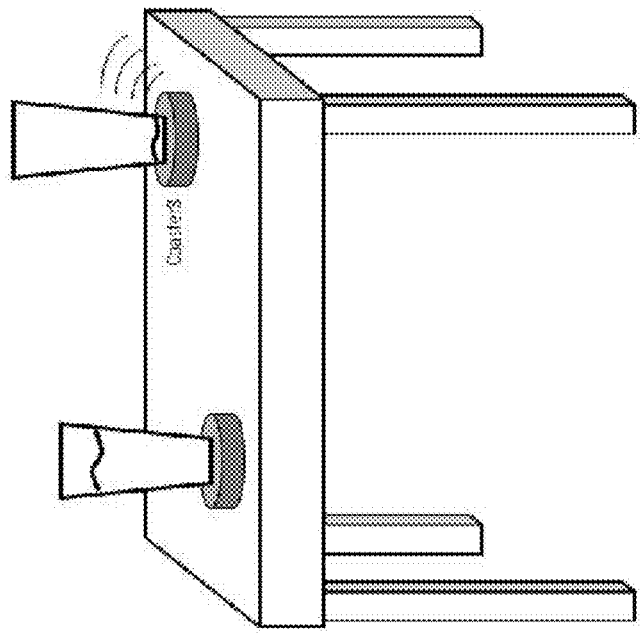
Fig. 24

SYSTEM AND METHOD FOR LOCATING A COMMUNICATION DEVICE

CROSS-REFERENCES TO RELATED APPLICATIONS

The present application claims priority from U.S. Provisional Application Ser. No. 62/633,043 filed on Feb. 20, 2018, which is hereby incorporated herein by reference in its entirety.

BACKGROUND

Indoor and outdoor positioning are beneficial in multiple use cases such as:
Indoor Navigation/Outdoor Navigation;
Indoor Wayfinding/Outdoor Wayfinding;
Proximity marketing;
Big data analytics;
In-building space utilization;
Safety and security;
People, animals and asset tracking;
Command and control.

Real time location estimation enables businesses to better understand the behavior of their employees and customers. It also allows businesses to efficiently utilize their assets. It brings social and commercial values to the customers and resolves their daily life matters.

Currently, multiple indoor and outdoor positioning technologies and standards are used in the market. Indoor positioning technologies require an infrastructure to be installed in the indoor location before a location estimation algorithm can operate. Those technologies are Wi-Fi hotspots, Bluetooth beacons, Bluetooth Low Energy (BLE) beacons, Ultra-Wide Band (UWB) transceivers, Radio Frequency Identification (RFID) transceivers, ZigBee transceivers among others. The latter technologies and standards can only function when hotspots, beacons (such as the ibeacon from Apple, and Eddystone from Google's Android, for example), transceivers or readers are installed in fixed locations in the indoor/outdoor facility (in-building, multiple floors, multiple rooms and indoor/outdoor spaces). Some technologies additionally require the availability of indoor floor civil plans as well (indoor maps).

An Allied Business Intelligence (ABI—https://www.abi-research.com/) research in 2017 shows that the average infrastructure cost per square meter (sqm) is approximately 16 US dollars (USD). The high cost makes it difficult for businesses to invest and adopt such real time indoor positioning systems due to investment in the Hardware (HW), Software (SW) as well as expenses due to recurrent operating, support and maintenance services cost.

Outdoor positioning is usually reliant on GNSS/GPS or Cellular (3GPP) and Non-Cellular (Lora/Sigfox) infrastructures.

BRIEF SUMMARY OF THE INVENTION

The techniques used in the conventional art are of the "non-uniform antenna array" type, in which fixed antenna elements (transceivers) detect the position of mobile communication devices. Instead, the technique of the present invention is based on a "variable non-uniform antenna array" where the devices to be located are the antenna elements (transceivers), and the status of these devices may vary between static (fixed) and dynamic (mobile).

According to the technique of the present invention, there are provided a plurality of communication devices and a processing server. The communication devices are configured for communicating with the server via the internet. Moreover, each communication device is configured for communicating with other communication devices, by emitting and receiving short range signals. At least a property of the received short range signals is measured and converted to signal data. Each communication device is associated with a user, and each user is associated with respective user data stored in the server. Moreover, the communication devices are configured for receiving data from one or more sensors (such as camera, microphone, accelerometer, pedometer, for example) associated with the devices.

Location data of at least a first communication device is known at a first time and stored in the first communication device and/or in the computing server at the first time. When at least a second communication device is inside a communication range of the first communication device at the first time, the location data of the first communication device is inherited by the second communication device and stored in the second device and/or in the computing server. When a second communication device is inside the communication ranges of two or more first communication devices with known respective locations, the server processes the known locations to yield a location of the second communication device.

When any of the signal data, the user data, and the sensor data corresponding to the first communication device(s) and/or the second communication device(s) have changed at a second time following the first time, the computing server is configured for re-processing the user data, the sensor data, and the signal data received by the first and/or second communication device(s) in order to update the location data of the first and/or second communication device(s).

The technique for positioning/locating a device of the present invention does not rely on indoor network infrastructure to be installed in indoor locations, does not require floor plans to be available, does not rely on the availability of GPS/GNSS for outdoor positioning, and does not rely on cellular and non-cellular networks for outdoor or indoor positioning.

Instead, in order to provide the location estimation of communication devices associated with users, the technique of the present invention relies on the collection of multiple data sources input (user data, sensor data, and short-range signal measurements) and data analysis and processing.

Optionally, the technique of the present invention further uses archived data relating to behavioral and mobility patterns of people, animals, and assets (objects) in order to predict the location of communication devices associated with people, animals, and assets (objects).

Therefore, an aspect of some embodiments of the present invention relates to a system for location estimation of communication devices, the system comprising a plurality of communication devices associated with respective users and a computing server. Each communication device is configured to: store a unique user identifier of the respective user; store a unique device identifier of the device; connect to an internet through a wireless communication network; emit first short range signals, receive second short range signals emitted by the other communication devices located within a communication range, and measure at least one property of the received second short range signals to generate signal data; receive sensor data from one or more sensors associated with the communication device. The computing server configured to: connect to the internet;

store user data sets, each user data set corresponding to a respective one of the user identifiers; communicate with at least some of the communication devices via the internet; process the user data, the sensor data, and the signal data received by one or more of the communication devices, in order to estimate a location of at least one of the communication devices. First locations of one or more first communication devices from the plurality of communication devices are known at a first time, and each first location is stored in a respective first communication device and/or in the computing server. Second locations of one or more second communication devices from the plurality of communication devices are not known at the first time. When at least one of the second communication devices is inside the communication range of one or more of the first communication devices at the first time, the signal data is sent to the server by the at least one of second communication devices and/or by the one or more first communication devices, and the server is configured for identifying the one or more first communication devices and the at least one second communication device, and for processing the first locations of the one or more first communication devices, in order to determine the second location of the at least one of the first communication device. When any of the signal data, the user data, and the sensor data corresponding to the at least one second communication device and/or to the one or more first communication devices has changed by a respective threshold at a second time following the first time, the computing server is configured for re-processing the user data, the sensor data, and the signal data received by the first and/or second communication device in order to update at least one of the locations of the first and/or second communication devices.

In a variant, at least one of the communication devices is configured for outputting a notification to the respective user, in response to a condition determined by the server's processing of the user data, signal data, and sensor data of the at least one of the communication devices and/or of one or more others of the communication devices.

In another variant, at least one of the communication devices is configured for outputting a notification to the respective user, in response to proximity of the at least one of the communication devices.

In yet another variant: the user data comprises one or more user interests; the server is configured for processing user data from at least two of the communication devices that are within each other's communication ranges by comparing the user interests; and at least one of the at least two of the communication devices is configured for outputting a notification to the respective user, if one or more user interests match.

In a further variant, the server is configured to store any of: archived and present signal data corresponding to at least one of the communication devices; archived and present user data corresponding to at least one of the communication devices; archived and present sensor data corresponding to at least one of the communication devices; archived and present estimated logical user location corresponding to at least one of the communication devices; individual device mobility patterns corresponding to at least one of the communication devices; mobility patterns of a group of devices which comprises the at least one of the communication devices; and sequence of events causing the at least one of the communication devices to be present in a defined logical location. The server is configured to estimate a future logical location of at least one of the communication devices by processing any of: archived and present signal data corresponding to at least one of the communication devices; archived and present user data corresponding to at least one of the communication devices; archived and present sensor data corresponding to at least one of the communication devices; archived and present estimated logical user location corresponding to at least one of the communication devices; individual device mobility patterns corresponding to at least one of the communication devices; mobility patterns of a group of devices which comprises the at least one of the communication devices; and sequence of events leading for a device being present in a defined logical location.

In some embodiments of the present invention, one of the communication devices is a smart coaster having a sensor configured for sensing a pressure applied by a cup placed on top of the smart coaster, and another one of the communication devices is configured for being carried by a waiter, the user data associated with the waiter comprising an interest regarding a level of fullness of cups at different tables. The sensor data from the smart coaster comprises data indicative of the level of fullness of the cup located on the smart coaster. The user data of the smart coaster comprising an identifier of a table on which the smart coaster is located. The server is configured for notifying the waiter's communication device, if the level of fullness of the cup placed upon the smart coaster and the identifier of the table on which the smart coaster are located match the level of fullness and table identifier comprised in the waiter's user data.

Another aspect of some embodiments of the present invention relates to method for location estimation of communication devices. The method comprises: providing one or more first communication devices associated with respective first users and having first known locations; providing one or more second communication devices associated with respective second users and having unknown locations; providing a server configured for storing one or more first sets of first user data associated with the respective one or more first users and one or more sets of second user data associated with the respective second users. At each of the first communication devices: receiving one or more first short range signals from any second communication device located within a first short range communication range of the first communication device; measuring at least one property of the one or more received first short range signals to generate one or more respective first signal data sets; receiving first sensor data from one or more first sensors in communication with the first communication device. At each of the second communication devices: receiving one or more second short range signals from any first communication device located within a second short range communication range of the second communication device; measuring at least one property of the one or more received second short range signals to generate one or more respective second signal data sets; receiving second sensor data from one or more second sensors in communication with the second communication device. At the server: receiving the one or more first signal data sets from each first communication device and/or the one or more second signal data sets from each second communication device; processing the first signal data sets to identify the first communication devices and/or processing the second signal data sets to identify the second communication device; determining the location for each second communication device, by processing the one or more first locations of the one or more first communication devices within the second communication range; receiving the first sensor data, the second sensor data, the one or more first signal data sets, and the one or more second signal data sets at a predetermined frequency; when any one of the first signal data sets, the first sensor data, the first user data, the second signal data sets, the second sensor data, and the second user data has changed by a respective threshold, processing the first signal data sets, the first sensor data, the first user data, the second signal data sets, the second sensor data, and the second user data to determine the locations of the first and/or second communication devices.

In a variant, the method further comprises communicating to the first and/or second communication devices data indicative of the respective locations by the server.

In another variant, the method further comprises: at the server: determining whether a predetermined condition for at least one of the communication devices is fulfilled, by processing the user data, the signal data, and the sensor data, corresponding to at least one of the communication devices; if the predetermined condition is fulfilled, generating one or more data pieces indicative of one or more notifications for respective communication devices; communicating each data piece to the respective communication device; at each communication device: receiving the respective data piece; outputting a notification to the respective user, in response to the respective data piece.

In a further variant, the method includes: at the server: determining whether at least two of the communication devices are within each other's short signal ranges, by processing the signal data corresponding to at least two of the communication devices; generating one or more data pieces indicative of one or more notifications for respective communication devices that are within each other's short signal ranges; communicating each data piece to the respective communication device; at each communication device: receiving the respective data piece; outputting a notification to the respective user, in response to the respective data piece.

A further aspect of some embodiment of the present invention relates to a system for location estimation of communication devices, the system comprising a plurality of communication devices associated with respective users. Each communication device is configured to: store a unique user identifier of the respective user; store a unique device identifier of the device; emit first short range signals, receive second short range signals emitted by the other communication devices located within a communication range, and measure at least one property of the received second short range signals to generate signal data; receive sensor data from one or more sensors associated with the communication device; store one or more user data sets, each user data set corresponding to a respective one of the user identifiers; process the user data, the sensor data, and the signal data received by one or more of the communication devices, in order to estimate a location of at least one of the communication devices. First locations of one or more first communication devices from the plurality of communication devices are known at a first time, and each first location is stored in a respective first communication device. Second locations of one or more second communication devices from the plurality of communication devices are not known at the first time. When at least one of the second communication devices is inside the communication range of one or more of the first communication devices at the first time, the signal data is processed by the at least one of the second communication devices, such that and the first locations of the one or more first communication devices are processed by the at least one of the first communication devices, in order to determine the second location of the at least one of the first communication device. When any of the signal data, the user data, and the sensor data corresponding to the at least one second communication device and/or to the one or more first communication devices has changed by a respective threshold at a second time following the first time, each communication device is configured for re-processing the user data, the sensor data, and the signal data received by the first and/or second communication device in order to update at least one of the locations of the first and/or second communication devices.

BRIEF DESCRIPTION OF DRAWINGS

FIG. 1 is a block diagram illustrating a system for locating a communication device, according to some embodiments of the present invention;

FIGS. 10a-10c are diagrams illustrating systems for locating communication devices using fixed transceivers, as known in the prior art;

FIG. 11 is a diagram illustrating a system in which at least some of the communication devices acting as transceivers are moving communication devices, according to some embodiments of the present invention;

FIG. 24 is a drawing illustrating interaction between a communication device associated with a user and a communication device associated with an object, according to some embodiments of the present inventions;

Figure 2:
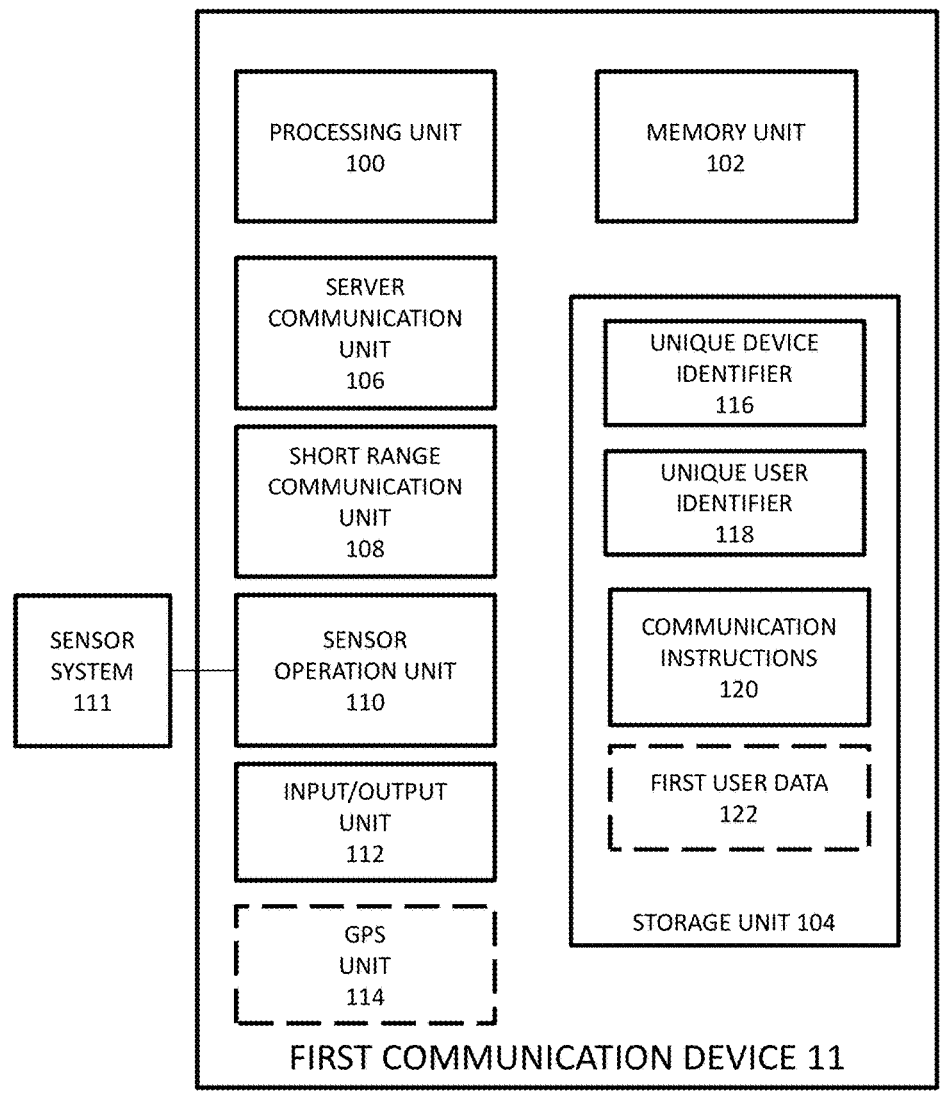
FIGS. 2 and 3 are block diagrams illustrating examples of first and second communication devices, respectively, in the system of FIG. 1.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

FIG. 1 is a block diagram illustrating a system 100 for locating a communication device, according to some embodiments of the present invention.

The system 100 includes one or more first communication devices 11 (associated with respective users or objects), one or more second communication devices 21 (associated with respective users or objects), and optionally a server 31.

The position of each first communication device 11 is known at least at a certain time point or during a certain time period. The position of each second communication device 21 is unknown at the certain time point or during the certain time period.

First communication devices 11 may be devices used by staff members working (or assets present) in an indoor location (e.g., employees of a bank, hospital, school, university, shopping mall, farm, airport/port, stadium, prison, jail, staff of a company, crew in an event, staff operating a train/metro/bus, etc.).

First communication devices 11 may have unique user identifiers with set of user data (e.g., User profile, User Name, User Code, User photo, User age, User profession, User interests/hobbies, User schedule, User location, etc.).

The location of the first devices may be updated automatically from a predefined user schedule, automatically by a positioning algorithm, manually by the user on an interface (for example of a check-in/check-out into a location features), or automatically by the last known GNSS/GPS position reading before the device moves from outdoor location to an indoor location (for the optional embodiment in which the first device 11 is equipped with GNSS/GPS).

The devices 11 and 21 are in communication with each other when they are within a certain distance (range) from each other. In the embodiments in which the server 31 is present, the devices 11 and 21 communicate with the server 31 either directly or via one or more other communication devices within communication range. According to some embodiments of the present invention, the second devices 21 inherit the locations of first devices 11 with which the second devices 21 communicate. In the embodiments in which the server 31 is present, the second devices 21, communicate the inherited locations as well as signal data extracted by analyzing (i.e. measuring a property of) the signals received from the first communication devices 11 to the server 31.

In some embodiments of the present invention, the second devices 21 are configured to process the locations of the first communication devices 11 and the signal data in order to determine locations of the communication devices 21. Optionally or alternatively, the server 31 receives the signal data from the communication devices 11 and/or 21, and processes the locations of the first communication devices 11 and the signal data in order to determine locations of the communication devices 21.

In a first example, a single second communication device 21 is in communication range with a single first communication device 11 having a known location L. The first communication device 21 sends a signal to the second communication device 11. The signal is encoded with data indicative of a unique identifier of the first communication device (e.g., MAC address, IMEI, Serial number, etc.). The second communication device 21 measures a property of the signal, which is related to the unique identifier of the first communication device 11, and creates signal data. The server 31 receives the signal data from the second communication device 21, and identifies the first communication device. The server 31 then updates the location of the second communication device 21, by setting the location of the second communication device to be equal to the location L of the first communication device 11.

In some embodiments of the present invention, the signal property measured by the second communication device includes the signal's strength, quality, timing advance, frame sequence phase, and timing. Such signal properties may be processed by the server 31 and/or by the second communication device 21 to estimate the distance D (or range) between the second communication device 21 and the first communication devices 11, the direction of arrival (DoA), also known as the angle of arrival (AoA), and to perform a mapping of devices 11 and 21 by groups or clusters.

Additionally or alternatively, the first communication device 11 receives a signal from the second communication device 21, and generates signal data accordingly. The server 31 receives the signal data from the first communication device 11 and identifies the second communication device 21 accordingly. The server 31 then updates the location of the second communication device 21, by setting the location of the second communication device to be equal to the location L of the first communication device 11.

If a second communication device 21 is in communication range with a plurality of first communication devices 11, the second communication device receives signals from the first communication devices 11, and generates a plurality of respective signal data sets, according to some embodiments of the present invention. In some embodiments of the present invention, the second communication device 21 receives the location of the first communication devices 11, processes the locations of the first communication devices 11 (and optionally the signal data), and yields a location of the second communication device 21 accordingly. Optionally or alternatively, the server 31 receives the signal data sets and identifies the first communication devices 11. The server 31 then processes the locations of the first communication devices 11 and yields a location of the second communication device 21 accordingly.

In some embodiments of the present invention, the signal property measured by the first communication device includes the signal's strength, quality, timing advance, frame sequence phase, and timing. Such signal properties may be processed by the server 31 and/or by the second communication device 21 to estimate the distance D (or range) between the second communication device 21 and the one or more first communication devices 11, the direction of arrival (DoA), also known as the angle of arrival (AoA), and to perform a mapping of devices 11 and 21 by groups or clusters.

Additionally or alternatively, the first communication devices 11 receive signals from the second communication device 21, and generate signal data sets accordingly. The server 31 receives the signal data sets from the first communication devices and identifies the second communication device 21 accordingly. The server 31 then updates the location of the second communication device 21, by processing the locations of the first communication devices 11. Optionally, the server 31 is configured for communicating to the second communication devices 21 data indicative of the determined locations. Each second communication device 21 then processes the respective location data in order to generate an output configured for relaying information about device's location to the user.

In the embodiments in which the server 31 is present, the first communication device 11 and the second communication device 21 are configured for sending signal data and sensor data (and optionally user data, if it is changed by the user) to the server 31 at predetermined time intervals. The server 31 is configured to determine if any of the signal data, sensor data, and user data has changed by respective thresholds. If this is the case, the user data, signal data, and sensor data are reprocessed in order to determine the locations of the communication devices 11 and 21.

In some embodiments of the present invention, the server 31 and/or the communication devices 11 and 21 are configured for determining whether a certain condition occurs, based on the locations of the devices, on the sensor data, on the signal data, and on the user data. If the condition occurs for a communication device (that may be a first or second communication device), then the server and/or the communication devices are configured for generating notification data and sending the notification data to the communication device for which the condition occurs. The notification data is processed by the communication device to generate a notification output to the user. In a non limiting example, when the location of a device is in the vicinity of a specific shoe store and the device's user is interested in running, the notification sent to the user's device is an advertisement about a new running shoe on sale at the specific shoe store.

The location of the first communication devices may be a generic location (math classroom, shoe store, living room, for example) or a precise location (coordinate location, for example). The accuracy of the resulting location of each second communication device depends on the accuracy of the first communication device(s) 11 communicating with the second communication device(s) 21. The location of the second communication device(s) may be for example a precise coordinate, "in the shoe store", "between the shoe store and the pet shop", "inside the house", "outside the house", etc.

In some embodiments of the present invention, the server 31 is capable of changing hardware and/or software settings on the communication devices 11 and 21, such as software updates and upgrades, changes of the power of short-range signal transmission, periodicity of short-range signal reception and transmission, etc.

It should be noted that in some embodiments of the present invention, short range communication occurs among first devices 11, and among second devices 21.

Figure 3:
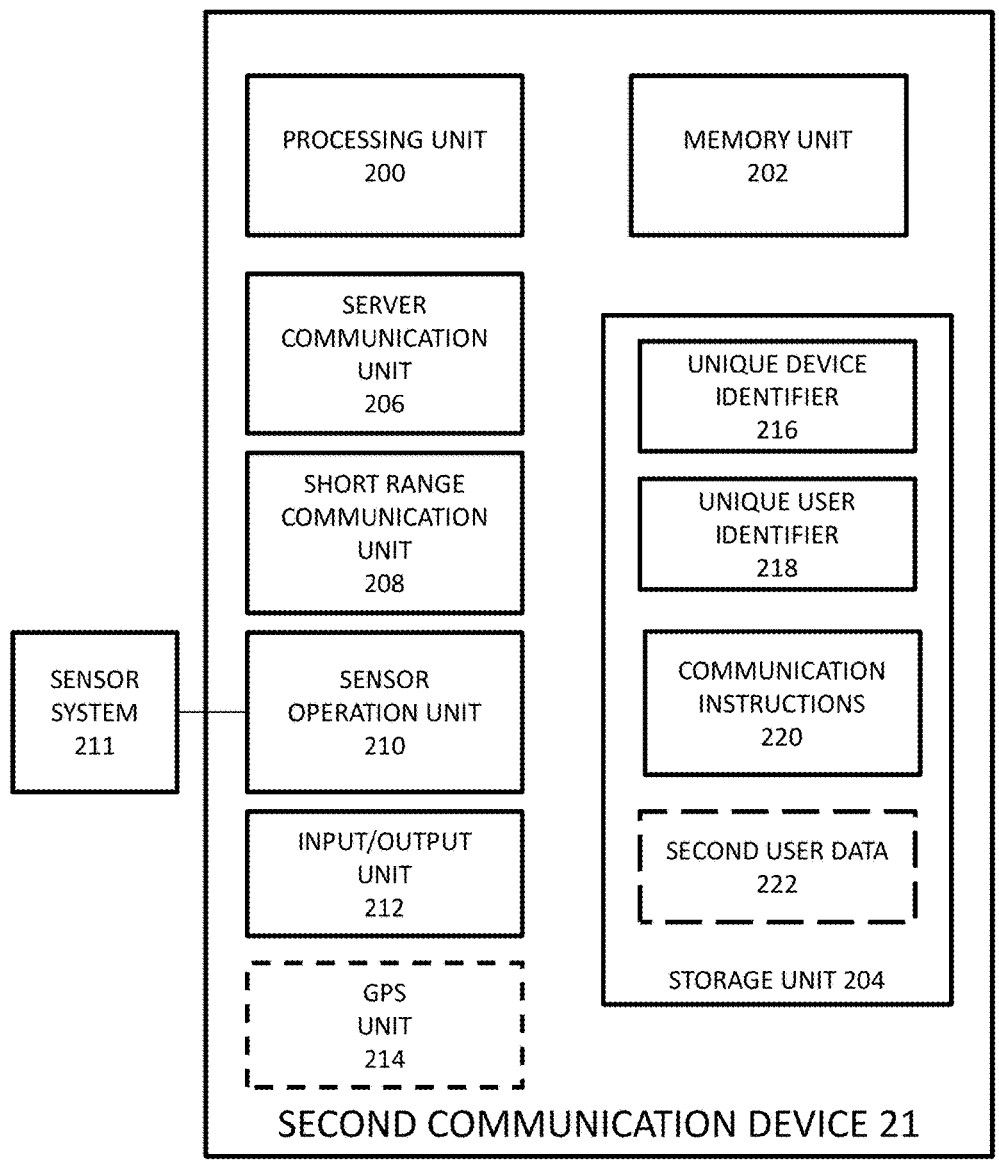

FIGS. 2 and 3 are block diagrams illustrating examples of first and second communication devices, respectively, in the system of FIG. 1.

The difference between the first and second communication devices is that at a first time, the locations of the first communication devices 11 are known, while the location the locations of the second communication devices 21 are not known.

In FIG. 3, the first communication device 11 has a processing unit 100, a memory unit 102, a server communication unit 106 (optionally), a short range communication unit 108, a sensor operation unit 110, an input/output unit 112, and a optionally a GPS unit 114.

The processing unit 100 may include one or more processors configured for processing data and configured processing data and for controlling the operation of the other elements of the first communication unit accordingly. The memory unit 102 is a volatile memory unit, configured for temporarily storing data to be processed by the processing unit 100 and data processed by the processing unit 100, according to need. The memory unit 102 may be any type of volatile memory unit, such as Random Access Memory (RAM), which may be Dynamic RAM (DRAM), or Static RAM (SRAM) for example. Generally, data to be processed by the processing unit 100 is loaded on the memory unit 102 for being quickly accessible to the processing unit 100.

The storage unit 104 is a non-volatile memory unit, configured for long-term storage of data, such as data to be processed by the processing unit 100 or data that has been processed by the processing unit 100. The storage unit may include software and/or hardware module configured for storing, receiving, and transferring data.

The server communication unit 106 (if present) includes software and/or hardware modules configured for allowing the first communication device to communicate with the server 31 via the internet, wirelessly or by wire. The server communication unit 106 may include any module configured for allowing connection of the first communication device 11 to the server via the internet, such as 3GPP, 2G GSM, 3G UMTS, 4G LTE, Narrow Band Internet of things (NB-IoT), LTE-M, 5G, Wimax, etc.

The short range communication unit 108 is configured for allowing the first communication unit 11 to directly connect with and transfer data with other first communication units 11 or other second communication unit 21 in a wireless manner. The short range communication unit 108 may communicate with short range communication units of other communication devices in range of a few meters, by emitting and receiving short range signals. The short range communication unit 108 and may include any wireless modules, such Bluetooth, RFID, NFC, Wi-Fi 33 hotspot etc., for example. The short range communication unit 108 is configured for encoding the emitted short range signals with data indicative of the identifier of the first communication device and/or the user associated with the first communication device. Optionally, the short range communication unit 108 is further configured for encoding the emitted short range signals with sensor data. The short range communication unit is configured for measuring a property of the received short range signals in order to extract the identifiers of the communication devices and/or the users associated with the communication device(s) that sent the received short range signals and the sensor data sent from the communication device(s) that send the received short range signals.

The sensor operation unit 110 includes software and/or hardware modules configured for receiving data from a sensor system 111 associated with the first communication device 11. Optionally, the sensor operation unit 110 is configured for controlling the operation of the sensor system 111, according to instructions from the processing unit 100. The sensor system 111 may include one or more sensors associated with, in communication with, or being part of the first communication device 11, such a camera (senses image/ video), microphone (senses voice/sound), light sensor (senses luminosity), pedometer, accelerometer, altimeter or barometer, heart rate sensor (heart beat detector), pressure sensor, weight sensor, vibration sensor, temperature sensor, pollution detection sensor, chemical sensor etc.

The input/output unit 112 is configured for enabling the user associated with the first communication device 112 to input data into the first communication device 11 via input modules and for allowing the first communication device 11 to output notifications to the user via output modules. The input and output module may be integrated in the first communication device or may be connectable to the first communication device. Input modules may include, for example, keyboards, touch screens, microphones, etc. Output modules may include, for example, displays, speakers, haptic modules, etc.

Optionally, the first communication device 11 includes a Global Positioning System (GPS) unit 118, configured for locating the first communication device 11.

Each first communication device includes a unique device identifier 116. Each first communication devices is generally associated with a unique user, and includes the unique user identifier 118. Optionally, the first communication device is configured for being associated with more than one user. In such an embodiment, each user is associated with a respective unique user identifier 118. Prior to use, each user can log into the first communication device 11 with the user's credentials. In this manner, the device 11 is "informed" about the user currently using the device 11. The unique device identifier 116 and unique user identifier(s) 118 are stored in the storage unit 104.

The storage unit 104 is also configured for storing communication instructions 120. The communication instructions 120 may include data configured for being processed by the processing unit 100 in order to control the operation of the other units of the first communication device 11. In this manner, the first communication device 11 can collect the signal data, sensor data, and (if applicable) user data necessary for the server 31 to determine the locations of one or more second communication devices in the range of the short range communication unit 108 of the first communication device 11. The communication instructions 120 are also configured for enabling the processing unit 100 to control the operation of the server communication unit 106 to communicate with the server 31 and of the short range communication unit 108 to communicate with other communication devices 11 and/or 12.

In some embodiments of the present invention, user data 122 associated with the one or more users associated with the first communication device 11 is also configured for being stored in the first communication unit 104. In this manner, if necessary, user data can 122 be communicated to the server or to other communication devices, as will be described in the examples below.

User data may include profile data (such as picture(s), interests, name, etc.), and may include location data of the users. The profile data of each user is accessible to the respective user and may be updatable by the respective user. For example, a user may be able to update the user's location via the input/output unit 112. In another example, the user data may be updated on the server side by a third party (e.g., an employer of the user setting the user's schedule and location). In such case, the user data 122 is updated in the storage unit 104 by the server 31.

The second communication device 21 in FIG. 3 includes the same features of the first communication device 11 in FIG. 2. It should be noted that the same device may be a first communication device during some times, and a second communication device during other times. For example, an employee having a set schedule and being present in a specific location during the employee's shift has a device the location of which is known during the employee's shift (as long as the employee carries the communication device at work). When the employee leaves the shift, the location of the employee, and therefore of the employee's device, may become unknown.

The first and second communication devices may be any communication devices able to perform the functions described in this patent application. Such devices may include laptop computers, tablet computers, smart phones, electronic wearables, for example. The scope of the present invention also extends to computer readable media configured for causing the first and second communication devices to perform the steps/functions described in the present patent application.

Figure 4:
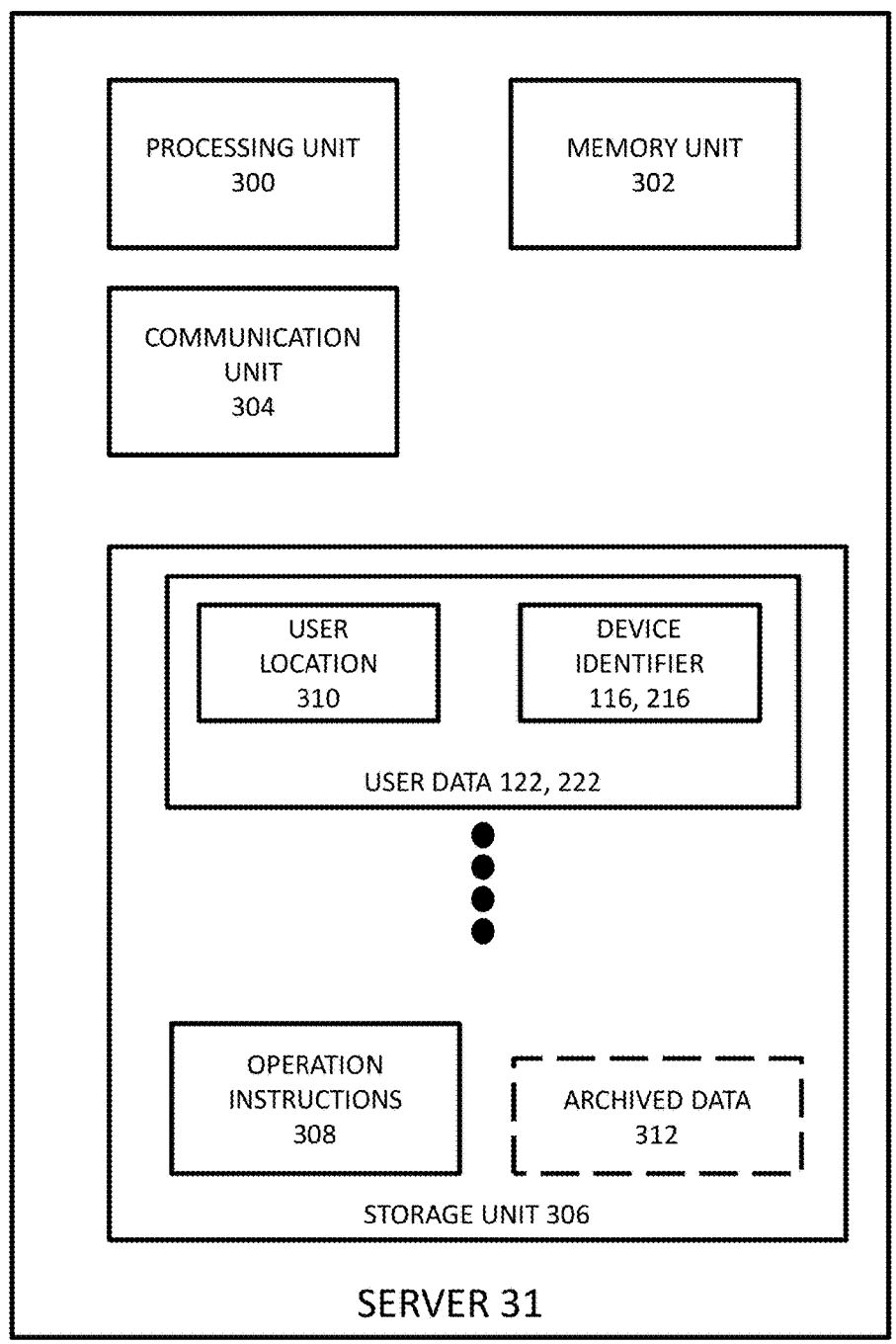
FIG. 4 is a block diagram illustrating an example of a server in the system of FIG. 1.

FIG. 4 is a block diagram illustrating an example of a server 31 in the system of FIG. 1.

The server 31 includes a processing unit 300, a memory unit 302, a communication unit 304, and a storage unit 306.

The processing unit 300 may include one or more processors configured for processing data and configured processing data and for controlling the operation of the other elements of the first communication unit accordingly. The memory unit 302 is a volatile memory unit, configured for temporarily storing data to be processed by the processing unit 300 and data processed by the processing unit 300, according to need. The memory unit 302 may be any type of volatile memory unit, such as Random Access Memory (RAM), which may be Dynamic RAM (DRAM), or Static RAM (SRAM) for example. Generally, data to be processed by the processing unit 300 is loaded on the memory unit 302 for being quickly accessible to the processing unit 300.

The communication unit 304 includes software and/or hardware modules configured for allowing the server to communicate with first and second communication devices via the internet, wirelessly or by wire. Optionally, the communication unit 304 is configured for allowing third party devices (e.g., computers, tablets, smart phones, etc.) for connecting to the server 31 and enabling users to update data stored in the server via the third party devices. For example, an employer may user a computer to connect to the server 31 in order to update user data (e.g. user locations at certain times) of employees who have communication devices that communicate with the server.

The storage unit 306 is a non-volatile memory unit, configured for long-term storage of data, such as data to be processed by the processing unit 300 or data that has been processed by the processing unit 300. The storage unit may include software and/or hardware module configured for storing, receiving, and transferring data.

The storage units configured for storing a plurality of user data sets (122, 222) associated with a plurality of users, communication instruction 308, and optionally archived data 312. Each user data set includes user location 310 (which may be known or unknown) and a device identifier 116, 216 associated with the respective user.

The operation instructions 308 include instructions for communicating with (sending data to and receiving data from) the first and second communication devices. The operation instructions 308 also include instructions for processing any of the locations, the user data, the sensor data, and the signal data in order to determine the locations of second communication devices. The operation instructions optionally include instructions configured to cause the server to create notification data when certain conditions are met by one or more communication devices or users, and to send the notification data to the relevant communication devices.

In some embodiments of the present invention, the storage unit 306 is configured for storing archived data 312 from at least one communication device (11, 21). Optionally, the operation instructions 308 include instructions for processing the archived data 312, in order to predict the future location of a device. The archived data may include any of the user data, sensor data, and signal data associated with the communication device.

Figure 5A:
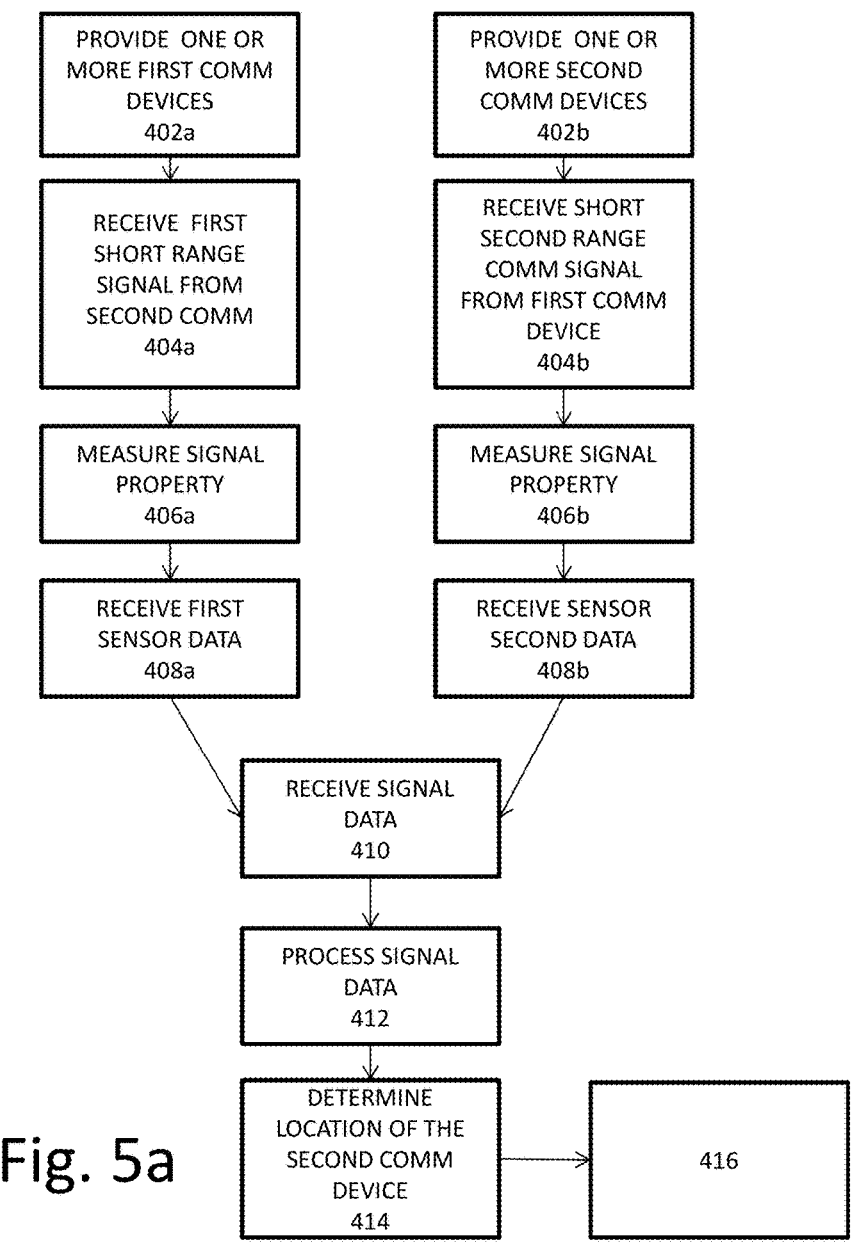
FIGS. 5a and 5b show a flowchart illustrating a method for locating a communication device, according to some embodiments of the present patent application.
Figure 5B:
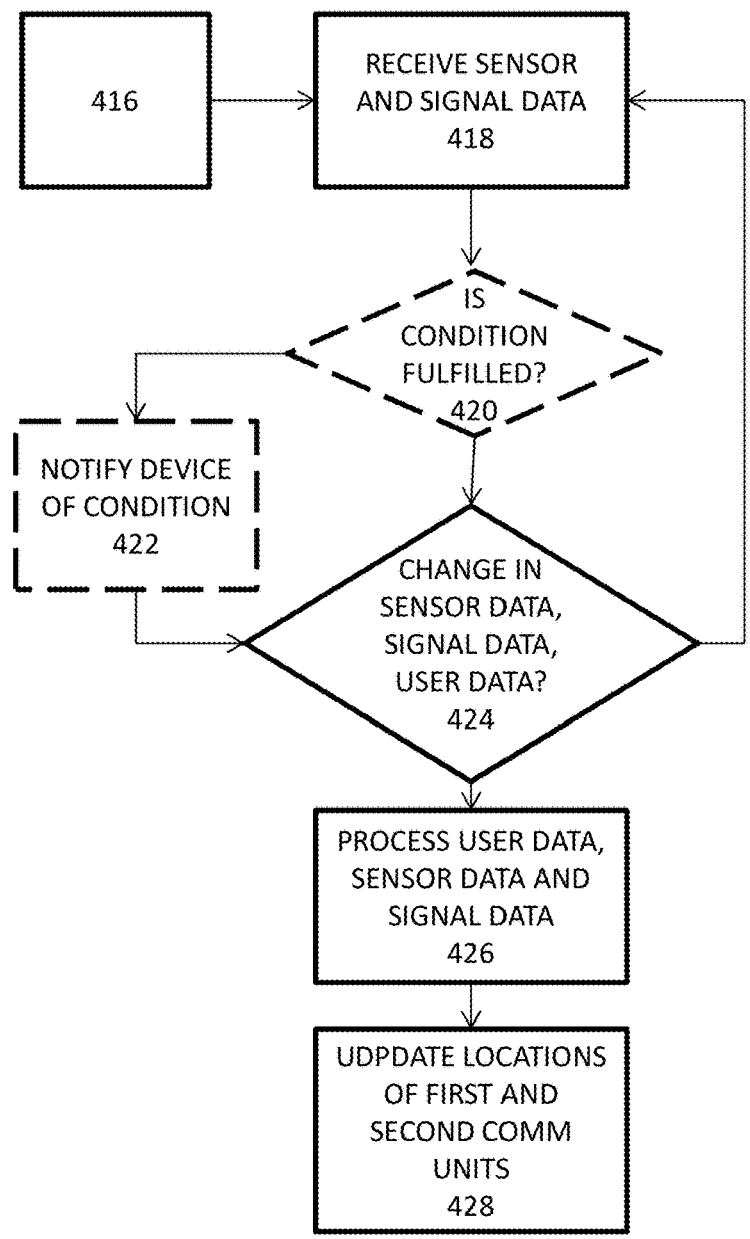

FIGS. 5a and 5b show a flowchart 400 illustrating a method for locating a communication device, according to some embodiments of the present patent application.

At 402a and 402b, one or more first devices and one or more second devices are provided, respectively. The location of the first devices is known at a certain first time, while the location of the second devices is unknown at the first time. At 404a, one or more the first devices receive one or more first short range signals from one or more second devices within their communication range, as described above. At 404b, one or more the second devices receive one or more second short range signals from one or more first devices within their communication range, as described above.

At 406a, the first devices measure a property of the received signals to create first signal data, as described above. At 406b, the second devices measure a property of the received signals to create second signal data, as described above.

At 408a, the first devices receive first sensor data from one or more first sensors associated with or integral with the first devices. At 408b, the second devices receive second sensor data from one or more second sensors associated with or integral with the second devices.

At 410, the server receives signal data the first and/or second communication devices. At 412, the server processes the signal data first and/or second communication devices. At 414, the server determines the locations of the second communication devices, according to the processing of 412, as described above.

In some embodiments of the present invention, if there is no server, the signal data, user data (including user location), and optionally signal data from the first communication device(s) are received and processed by the second communication device(s) to determine the location(s) of the second communication device(s).

At 418, the server (or second communication device, if the server is not present) receives sensor data and signal data from the first and second communication devices. Optionally, at 420 the server (or the first and/or second communication devices, if the server is not present) checks whether a condition has been fulfilled for any of the first and/or second devices, by processing the sensor data, signal data, and user data (which includes location data). If the condition has been fulfilled, the server sends notifications to the relevant communication devices (or the relevant communication device generates a notification to output, if the server is not present).

At 422, at a second time following a first time by a certain time interval, the server checks whether signal data, and/or sensor data, and/or user data associated with each communication device have changed by respective thresholds. Optionally, if there is no server, the each communication devices checks whether the signal data and/or sensor data, and/or user data associated with the device has changed have changed by respective thresholds.

If such is not the case, the server or communication device waits for the certain time interval and returns to step 418. If signal data, and/or sensor data, and/or user data associated with one or more communication device has changed by respective thresholds, then the signal data, sensor data, and user data that has changed is processed at 426 to determine the locations of the associated communication devices. At 428, the locations of the first and second devices are updated, according to the processing of step 426.

FIGS. 6-9 are block diagrams illustrating different modes of communication between the communication devices 11 and 21 and the server 31 in a system of the present invention.

Figure 6:
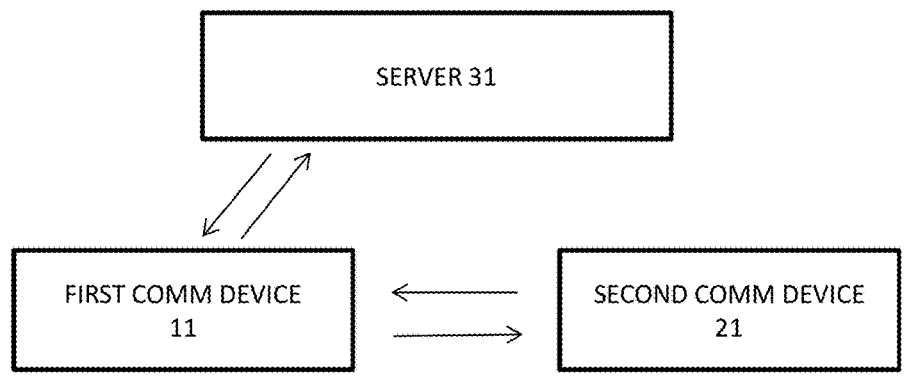
FIGS. 6-9 are block diagrams illustrating different modes of communication between the communication devices and the server in a system of the present invention.

A two-way data communication exists between the server 31 and the devices 11 and 21. In FIG. 6, the first and second communication devices communicate between each other via short range signals. The first device 11 communicates directly with the server 31, while the second device 21 communicates with the server 31 via the first device 11.

Figure 7:
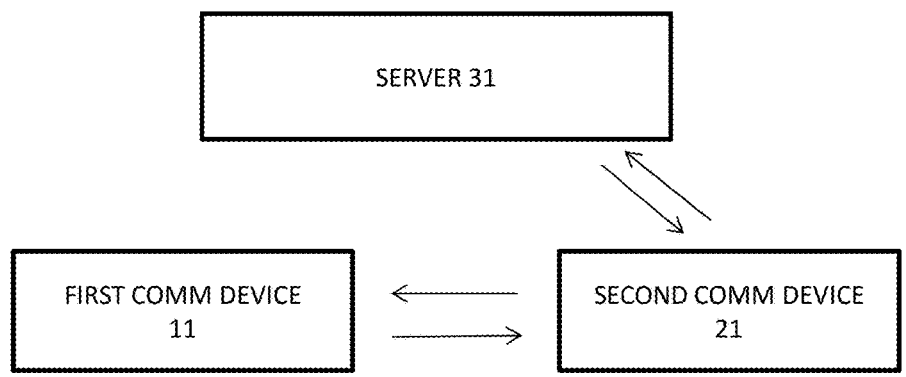

In FIG. 7, the first and second communication devices communicate between each other via short range signals. The second device 21 communicates directly with the server 31, while the first device 11 communicates with the server 31 via the second device 21.

Figure 8:
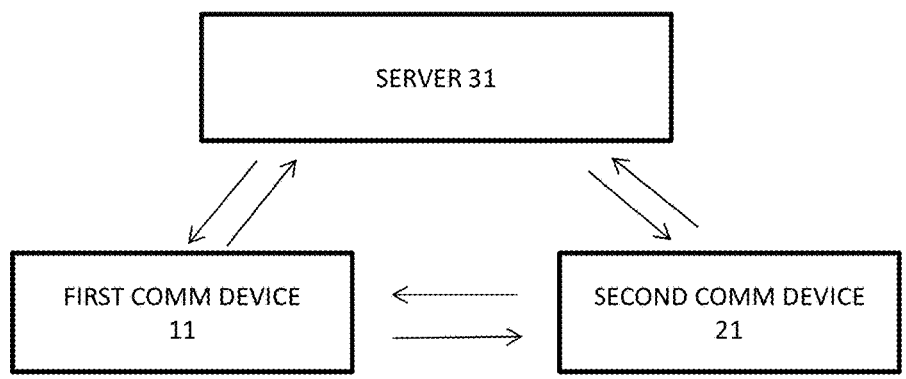

In FIG. 8, the first and second communication devices communicate between each other via short range signals. The first device 11 and the second device 21 communicate directly with the server 31.

Figure 9:
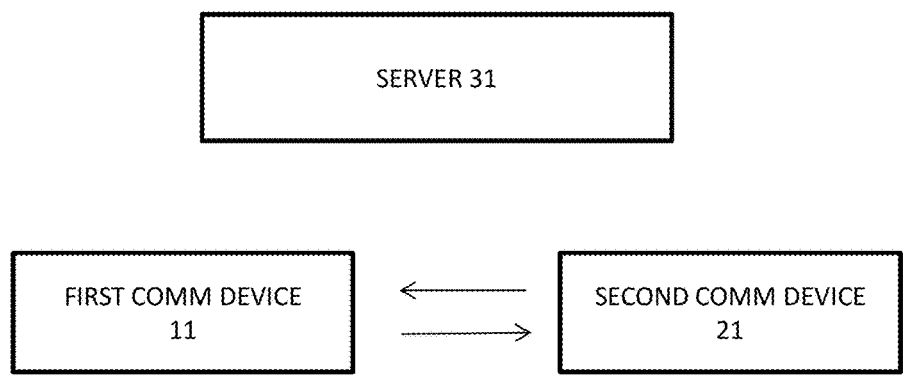

In FIG. 9, the first and second communication devices communicate between each other via short range signals. Neither the first device 11 nor the second device 21 communicates with the server. In such a case, the devices 11 and 12 are configured for processing at least the signal data (and optionally the sensor data and/or user data), in order to choose whether and how to communicate with each other.

FIGS. 10a-10c are diagrams illustrating systems for locating communication devices using fixed transceivers, as known in the prior art. The prior art techniques rely on antenna arrays having fixed antenna elements 14 (Transceivers) and detects the position of mobile objects 15.

FIG. 11 is a diagram illustrating a system in which at least some of the communication devices acting as transceivers are moving communication devices, according to some embodiments of the present invention. The positioning technique of the present invention is based on a "variable non-uniform antenna array", where the devices 11 with known position and the devices 21 to be located are the antenna elements (transceivers). The position of the devices 11 and 21 can vary between static (fix) and dynamic (mobile). Moreover, once the location of a second device 21 is determined, the second device 21 may act as a first device with known location and may be used to determine the location of another second device 21 the location of which has not been determined yet.

The technique of the present invention uses continuous signal measurements of one communication device or multiple communication devices received from the remaining communication devices in the group. A non limiting example of a group of 3 users may be a first device 11 with known location and two second devices 21a and 21b. The device 21a is located by analyzing signals/data received and transmitted between two or multiple elements of the following four: the device 21a itself, the device 21b, the device 11 and the server 31, depending on the mode of communication, which may be any mode described in FIGS. 6-9.

The short range wireless signal cannot penetrate obstacles such as walls, floor, doors and windows. Thus, the technique of the present invention is able to estimate the geometry of the space where the communication devices are distributed.

The location of the devices 11 and 21 is then mapped into a 4-dimensional 4D (T, X, Y, Z) of time domain (T) and space domain (X, Y, Z) where X, Y, Z are the 3D coordinates relative to multiple origins i.e. multiple devices. Three-dimensional mapping can be performed according to an absolute origin O (X0, Y0, Z0) chosen by the server 31. The mapping can also be performed into a 3-dimensional 3D (T, X, Y) of time domain (T) and space domain (X, Y) where X, Y are the two-dimensional coordinates relative to multiple origins i.e. devices 11 and 21. Two-dimensional mapping can be performed to an absolute origin O (X0, Y0) chosen by the server 31.

Figure 12:
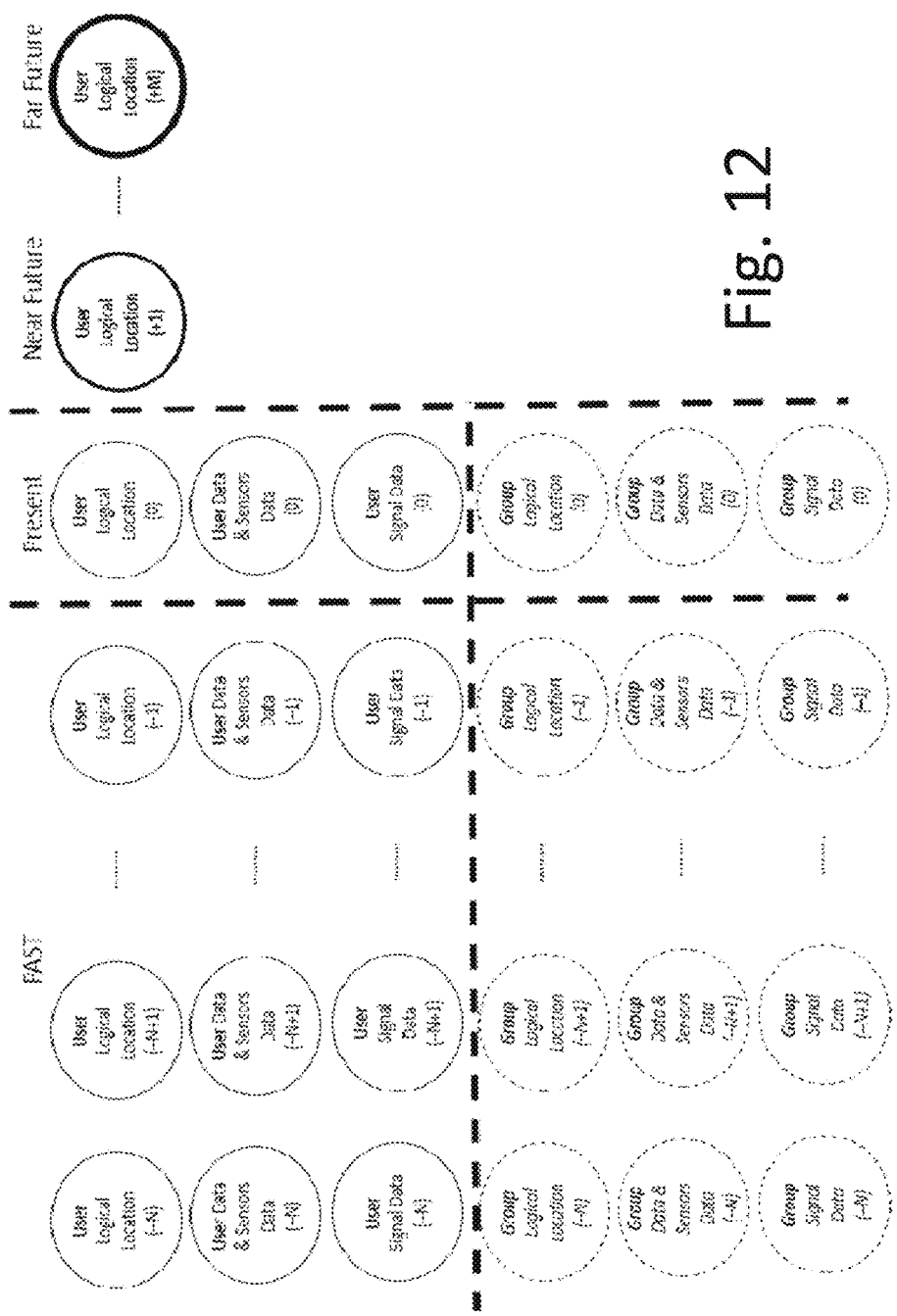
FIG. 12 is a diagram illustrating archived data used in order to predict the location of a communication device at a future time, according to some embodiments of the present invention.

FIG. 12 is a diagram illustrating archived data used in order to predict the location of a communication device at a future time, according to some embodiments of the present invention.

In some embodiments of the present invention, besides estimating the current logical location, the technique of the present invention is further configured to estimate a device's logical location in the future. This is performed from the continuous learning based on archived and present data for every recurrent device and group of devices of the system. The data upon which the learning is based may include:
Archived and present signal data;
Archived and present user data;
Archived and present sensor data;
Archived and present estimated location;
Individual device/user mobility patterns and Group of devices/users mobility patterns;
Sequence of events leading for a device/user being present in a defined location;

As seen in FIG. 12, in order to estimate the logical location of a device/user in the near or far future, past and present data is analyzed and one or multiple predictions are performed. As the particular user/device has been in proximity of a larger group of users in the present and in the past, the technique of the present invention may use the additional group data in order to increase the confidence of the prediction.

Figure 13:
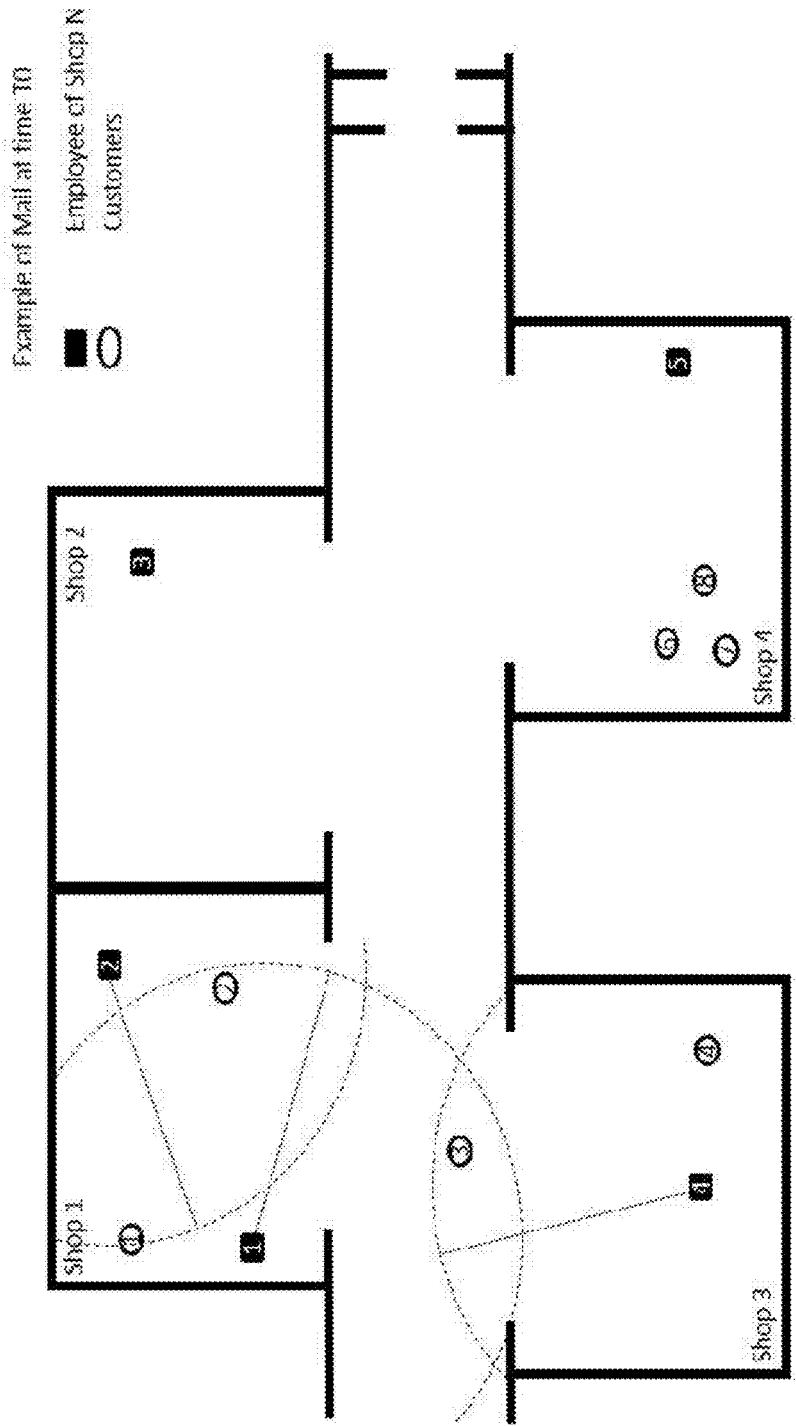
FIG. 13 is a diagram illustrating locations of different users (using respective communication devices) at a first time, according to some embodiments of the present invention.

FIG. 13 is a diagram illustrating locations of different users (using respective communication devices) at a first time, according to some embodiments of the present invention.

In a mall with multiple shops, shop owners/employees are registered (automatically or manually) to be present in their respective place of work (shop N) at a predefined time for a defined duration. For example, employee 1 is scheduled or checked in in Shop1 from hours 9:00 until 14:00 and from hours 15:00 until 18:00, employee 5 is scheduled or checked in shop4 between 8:00 until 15:00, etc. This user data is an additional input that will help logically map the rest of the users of the system on top of the signal and sensor data. Once the location of a shopper inside the mall is determined, the system of the present invention optionally improves the shopper experience in the mall by sending relevant advertisements.

The black squares illustrate first devices associated with employees and having known location at a first time (T0). The white ellipses illustrate second devices associated with customers, the location of which is to be determined.

In this example, using any communication model shown in FIGS. 6-8, the position of customers at time T0 can be estimated as below.

Customer 1 and Customer 2 are present at Shop 1 as they are both in the signal range of Employee 1 and Employee 2.

Employee 1 is present at Shop 1 as he is in the signal range of Employee 2.

Employee 2 is present at Shop 1 as he is in the signal range of Employee 1.

Customer 3 is between shop 1 and shop 3 as he is in the signal range of Employee 1 of Shop 1 and Employee 4 of Shop 3.

Customer 4 is present in shop 3 as he is in the signal range of Employee 4 of Shop 3 but not in the signal range of any other employee of any other shop.

Similarly, customers 6, 7, 8 are in shop 5 as they are in the range of Employee 5 of Shop 4 but not in the signal range of any other employee of any other shop.

Figure 15:
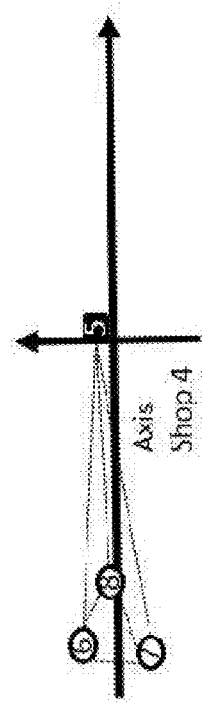
FIGS. 14 and 15 are diagrams illustrating two-dimensional representations of the locations of the different users of FIG. 13, according to certain exemplary points of reference, according to some embodiments of the present invention.
Figure 14:
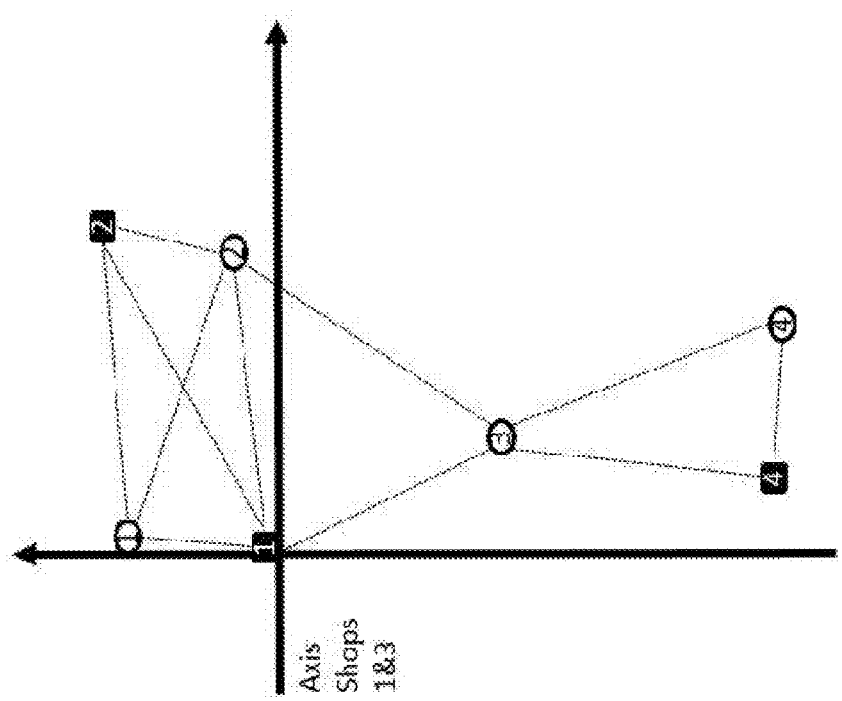
Figure 16:
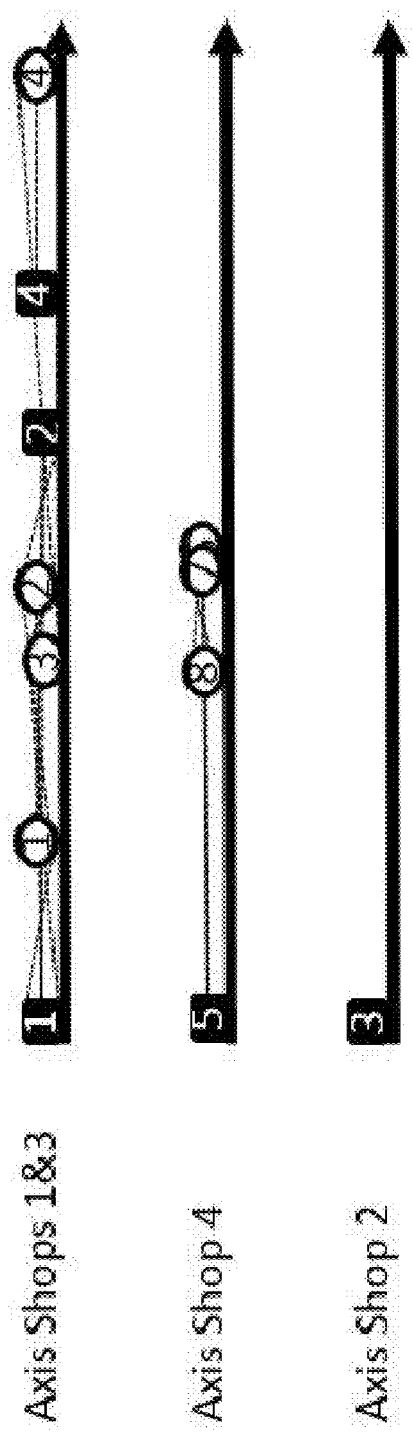
FIG. 16 is a diagram illustrating one-dimensional representations of the locations of the different users of FIG. 13, according to certain exemplary points of reference, according to some embodiments of the present invention.
Figure 17:
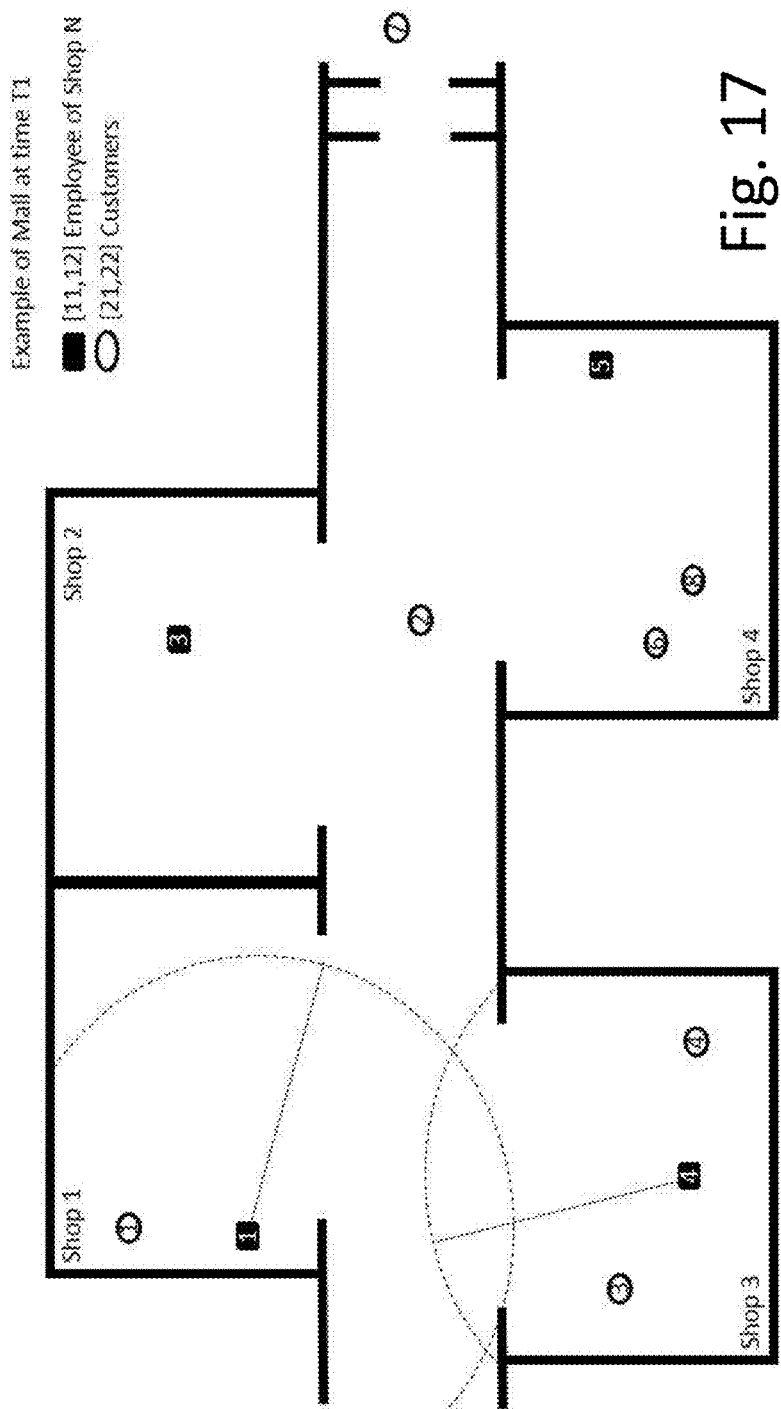
FIG. 17 is a diagram illustrating locations of the different users of FIG. 13 at a second time following the first time, according to some embodiments of the present invention.

FIGS. 14 and 15 are diagrams illustrating two-dimensional representations of the locations of the different users of FIG. 13, according to certain exemplary points of reference, according to some embodiments of the present invention. FIG. 16 is a diagram illustrating one-dimensional representations of the locations of the different users of FIG. 13, according to certain exemplary points of reference, according to some embodiments of the present invention;

FIG. 17 is a diagram illustrating locations of the different users of FIG. 13 at a second time T1 following the first time T0, according to some embodiments of the present invention.

In this example, the technique of the present invention can estimate the position of customers at time T1 with the knowledge of their positions at time T0 and the knowledge of additional input from sensors and user data, as below.

Let Ti be the time interval between T1 and T0. Ti, may be for example, 10 seconds, 15 seconds, 20 seconds, or any other desired time interval.

During Ti, additional data is collected from the sensors. In this example data is retrieved from pedometers/accelerometers of the first and second devices. The positions of customers and employees at time T1 can be estimated as below.

Both Customer 1 and Employee 1 haven't traveled any considerable distance during Ti.

Customer 1 is still present at Shop 1 as he is in the signal range of Employee 1.

Employee 1 is present at Shop 1 as he is in the signal range of customer 1.

Employee 2 has traveled a considerable distance during Ti.

Employee 2 has left Shop 1 as he is no longer in the signal range of Employee 1 neither Customer 1.

Customer 2 has traveled a considerable distance during Ti.

Customer 2 is between shop 2 and shop 4 as he is in the signal range of both Employee 3 of shop 2 and Employee 5 of shop 4.

Customer 3 has traveled a minimal distance during Ti.

Customer 3 is present in shop 3 as he is in the signal range of Employee 4 of shop 3.

Customer 4 hasn't traveled any considerable distance during Ti.

Customer 4 is still present in Shop 3 as he is still in the signal range of Employee 4 of Shop 3.

Similarly, customers 6 and 8 are still in shop 5 as they haven't traveled any considerable distance during T1 and they are still in the signal range of Employee 5 of Shop 4, but not in the signal range of any other employee of any other shop.

Similarly, Employee 5 is still in Shop 4 as he hasn't traveled any considerable distance during T1 and he is still in the signal range of customers 6 and 8.

Customer 7 has traveled a major distance during T1 and he is no longer in the signal range of any employee of any shop. At this point, all sensor inputs are used before declaring that Customer 7 has left the shopping mall. In some embodiments of the present invention, the technique of the present invention may be used to estimate if Customer 7 is outdoors, in the bathroom, in the parking lot etc. by image/voice/light pattern recognition and pattern matching. The technique of the present will continue estimating the logical position of Customer 7 for a period, after which Customer 7 is considered out of the system and his position shall be tagged as undefined. After which, customer 7 position may be tracked by using additional data from other systems such as GNSS/GPS or Cellular Network positioning. Customer 7 will be flagged as present in the system when he's detected again in the signal range of any devices 11 and/or 21.

Figure 18:
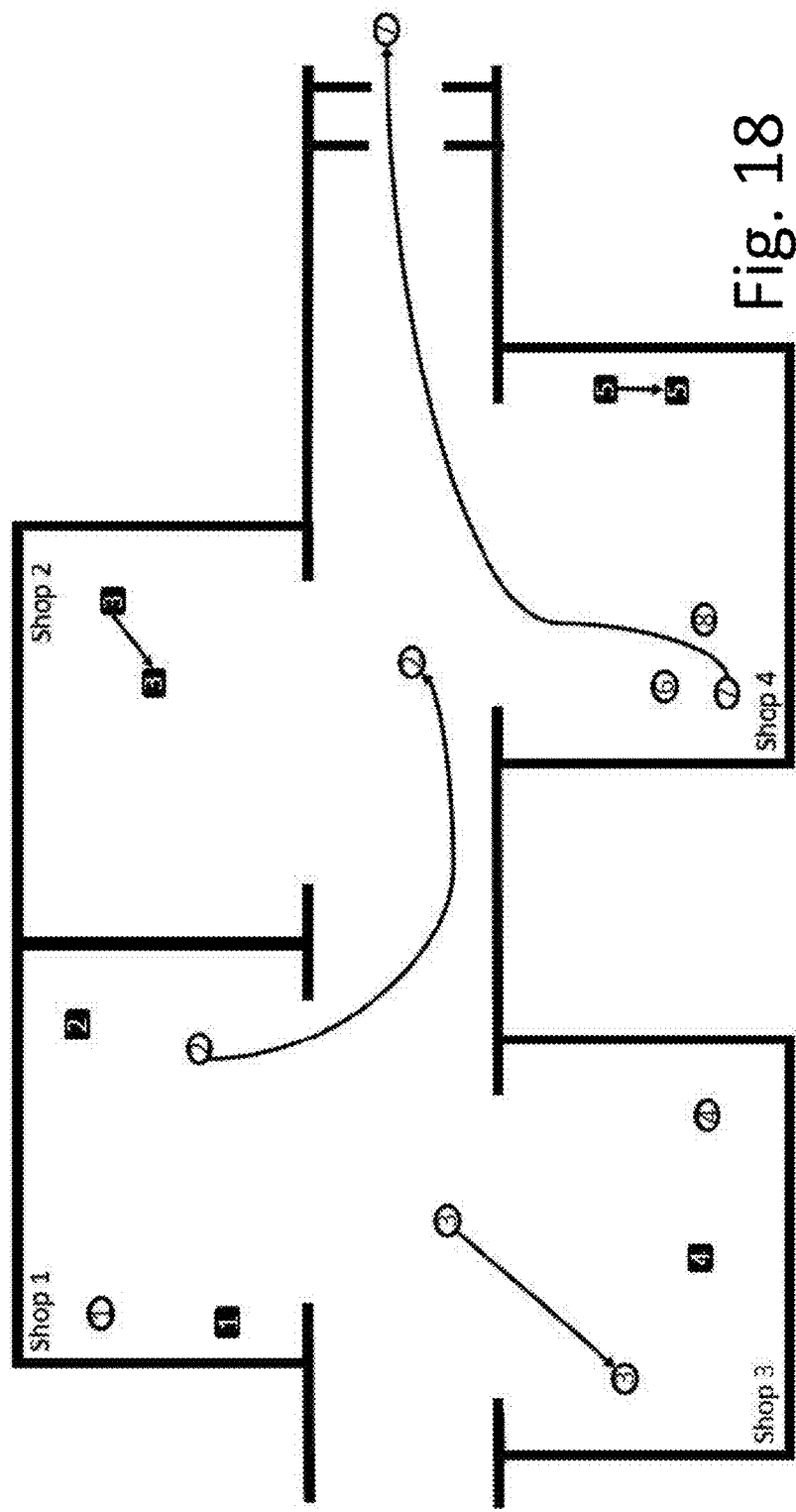
FIG. 18 is a diagram illustrating paths along which the users of FIGS. 13 and 17 have moved between the first and the second time.

FIG. 18 is a diagram illustrating paths along which the users of FIGS. 13 and 17 have moved between the first and the second time.

The correlation and superposition of 2D Mesh Mapping at T0 (FIG. 13) and 2D Mesh Mapping at T1 (FIG. 17) allows the deduction of a 3D projection Time and Space (T, X, Y) allowing the tracking of system users over time.

The choice of the axis origin may be based on cumulative data analysis from T0, T1, T2, Tn where n is between 0 and infinity. For instance, any device 11 or 21 that hasn't traveled at all during [T0, Tn] (i.e. pedometer is showing 0 variation and accelerometer is showing 0 variation) can be selected as an absolute origin of the 2D axis, example of Employee 4 of shop 3.

FIGS. 19-23 are diagrams illustrating positions of users having communicating devices at different times, according to some embodiments of the present invention.

Using any of the communication modes shown in FIGS. 6-9 and based on the stored user interest data, the technique of the present invention can be used to decide whether to perform signal measurement collection or not. It can also be used to decide whether to send notification to the users or not.

In the following example, there are 3 system users present at a park;

User 1 has stored in his user profile (user data) the following interests:
Art—mosaic painting;
Sports—Central park—Running in a group—Running with active runners.

User 2 has stored in his user profile the following interests:
Sports—basketball;
Sports—Running in a group—Running with active or idle runners.

User 3 has stored in his user profile the following interests:
Dancing—Salsa—Roomba;
Sports—Running in a group;
Reading—Comic books.

Figure 19:
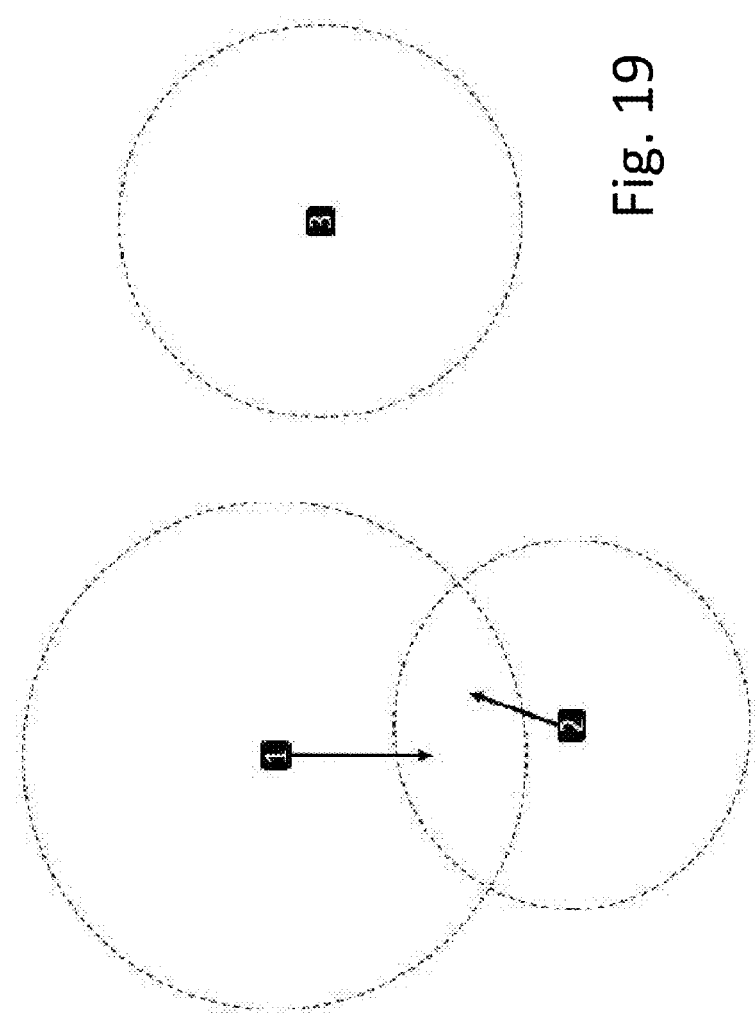
FIGS. 19-23 are diagrams illustrating positions of users having communicating devices at different times, according to some embodiments of the present invention.

In FIG. 19, at time T0, the devices of the three users are performing short range measurements to detect other users of the system that are in proximity. As no devices are detected in the short signal communication range, no notification is exchanged between the users.

Figure 20:
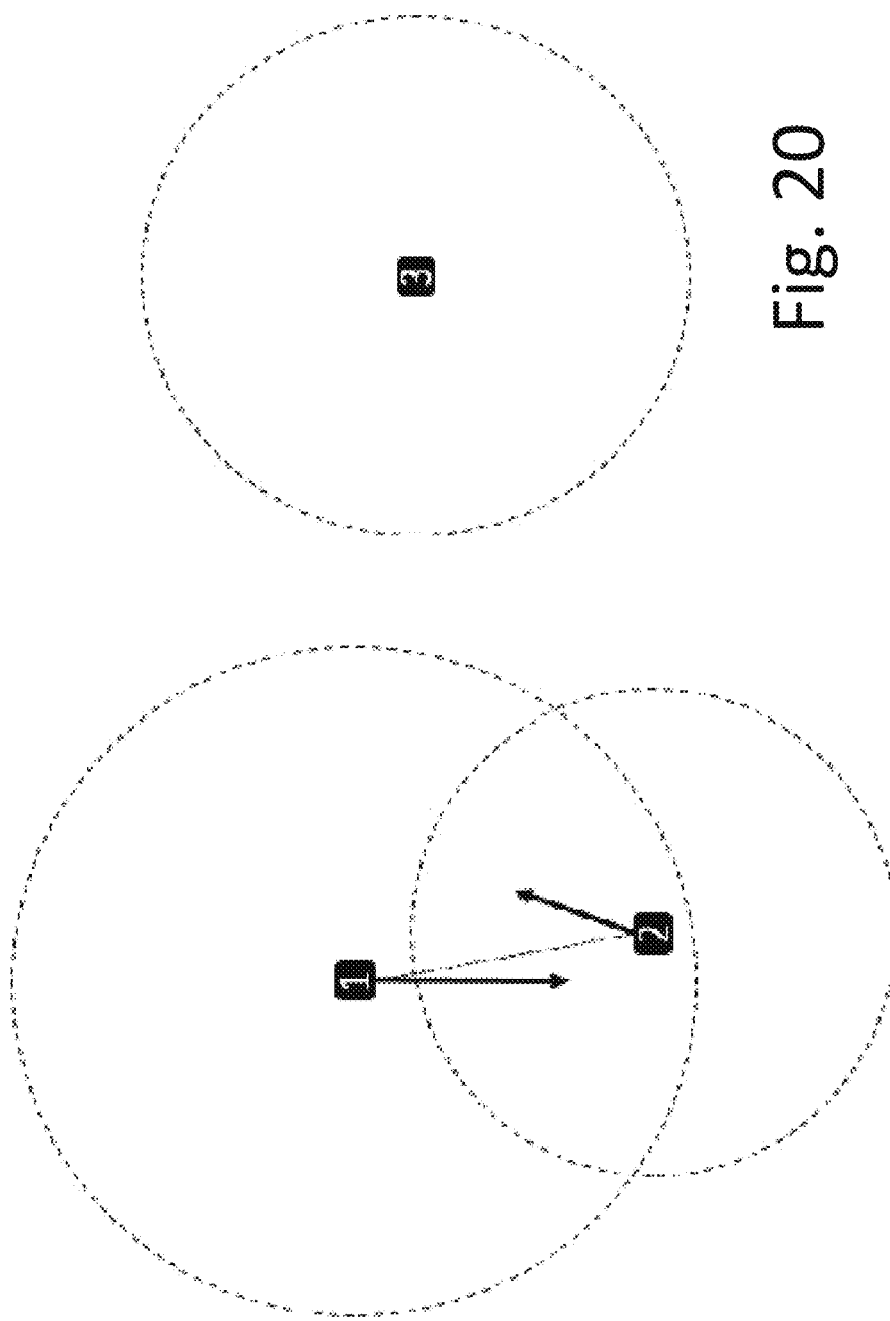

In FIG. 20 at time T1, following T0, User 1 detects User 2 in his signal range. A user data matching is performed and it is determined that User 1 and User 2 have a common interest of "Sports—Running in a group—Running with active runners". Notifications (visual/audio/tactile) of interest between User 1 and User 2 "run together?" are exchanged between the devices of User 1 and User 2.

User 1 and User 2 can approach each other and decide to run together or not. The method of combining user proximity knowledge with user interest knowledge has facilitated the social tie between users of the system. In addition, User1 and User2 are tagged to be located in "central park".

Figure 21:
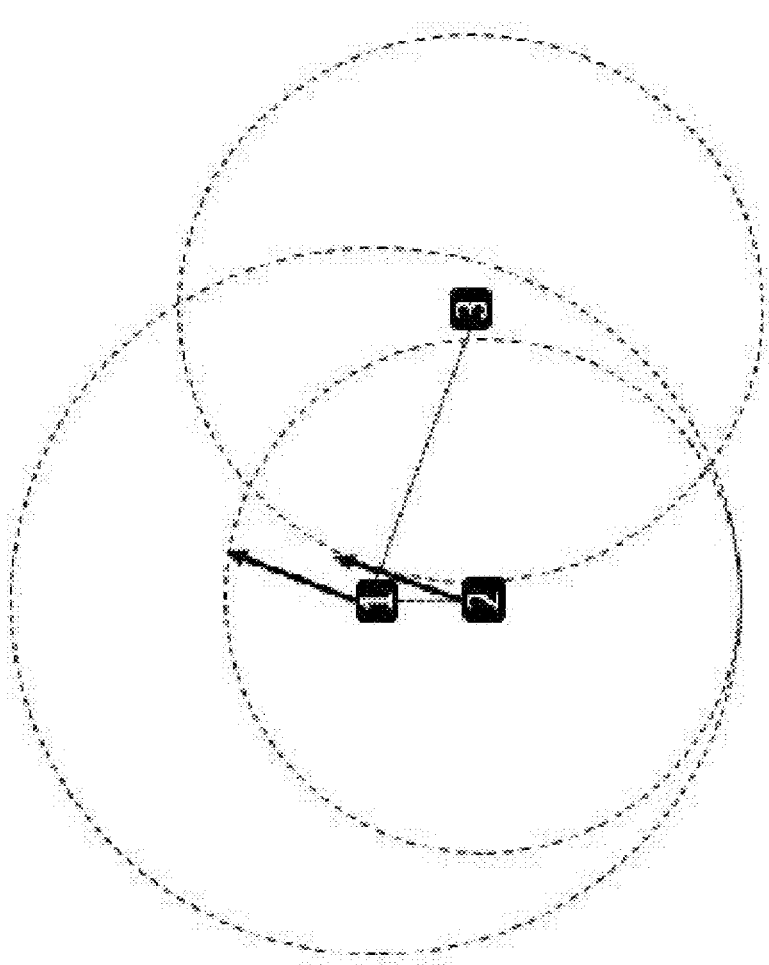

In FIG. 21, at time T2 following T1, User 1 and User 2 are running together. User 1 detects User 3 in his signal range. User data user matching is performed and it is determined that User 1 and User 3 have a common interest of "Sports—Running in a group" but User 1 has preference with "running with active runners" while User 3 is sitting idle as indicated by the sensor data (pedometer/accelerometer/heart beat rate detector in this case). Therefore, no notifications exchanged between the devices of between User 1 and User 3.

Figure 22:
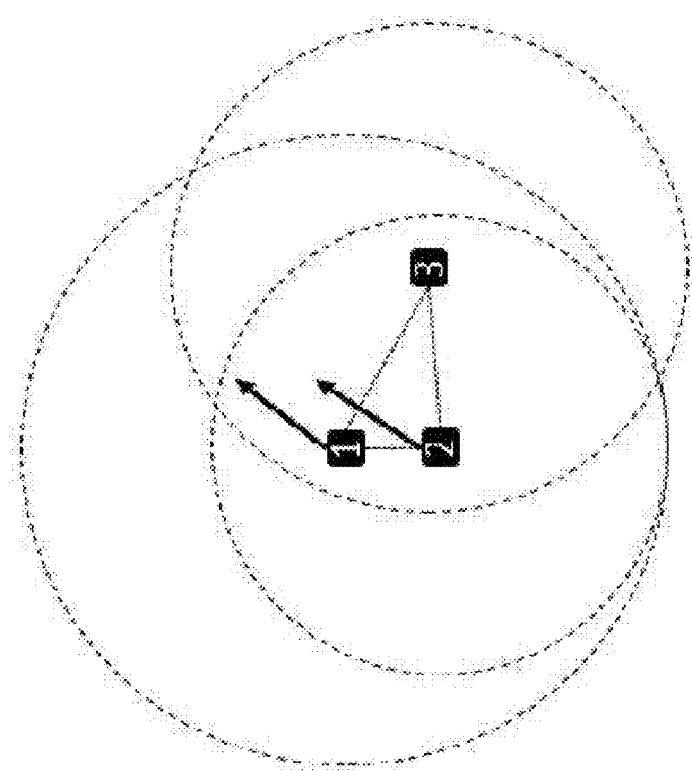

In FIG. 22, at time T3 following T2, User 1 and User 2 are still running together. User 2 detects User 3 in his signal range. User matching is performed and it is determined that User 1 and User 3 have a common interest of "Sports—Running in a group". From T1 and T2, it is known that the interests of User 1 do not match with the status of User 3 (idle) and that the interests of User 2 match with the status of User 3 (idle). Through analysis of this data, the best interest of the group of Users 1, 2, 3 is determined. Instead of sending a notification to User 3 "run together?", a notification of "start running, so we can run together" is sent to User 3. User 3 can decide whether to run or stay idle.

Figure 23:
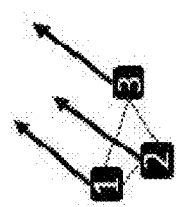

In FIG. 23, at time T4 following T3, if User 3 decides to start running while in the range of User 1, then the algorithm will send User 3 the notification "run together?". At this stage, all three users can mutually decide whether to run in a group of three and the technique of the present invention has accomplished its social value of bringing people in proximity together even when they don't know each other. In addition, Users 1, 2 and 3 are tagged to be located in "central park".

Another example of bringing people together via the technique of the present invention may occur when system users are present in the same restaurant, pub, gym or event. The same concept as described in FIGS. 19-23 applies. People dining in the same restaurant, having common interests can benefit from the hybrid artificial intelligent positioning and notification system (HAIPANS) of the present invention. As such places are usually crowded, it might be practically difficult for users to recognize other system users upon notification receipt.

Based on user settings on the devices 11 and 21 and on the server 31, the algorithm can send additional user profile with the notification to facilitate the meeting. Additional information such as a photo of the user or a description of the user appearance or a description of the user clothes etc.

Additionally, the technique of the present invention may be used to automatically identify if a place is crowded or not by SOUND NOISE LEVEL analysis using sensor data input from the microphone/voice recorders. If it is determined that the place is crowded, via analysis of the sensor data, additional user profile data can be automatically exchanged between users with the notification, in order to facilitate the meeting. Additional user profile data may include, for example a photo of the user, or a description of the user appearance, or a description of the user clothes etc.

Another example in which the technique of the present invention is used to send notifications to devices according to shared interests of the associated users, relate to commuters in a bus line. No figure is used to describe this example.

In this example, there are multiple commuters waiting at a bus Station 5 at 18:00.

Commuter 1 is waiting a bus to take him from Station 5 to Station11.

User1 data associated with Commuter 1 shows: Station5 to Station11—open to new friendships—open to chat.

Commuter 2 is waiting a bus to lift him from Station 5 to Station9.

User2 data associated with Commuter 2 shows: Station5 to Station9—need a quiet time.

Commuter 3 is waiting a bus to lift him from Station 5 to last Station18.

User 3 data associated with Commuter 3 shows: Station5 to Station18—feeling lonely.

The bus transporting commuters from Station 1 to Station 18 is arriving to the Station5.

Bus driver Johnny Smith is working for San Diego Bus Services company route 182.

As Commuter 1 and Commuter 3 are detected to be in proximity to each other's, and User 1 data and User 3 data of the system having common interest, Commuter 1 is notified that Commuter 3 is sharing the same route until Station 11 and that Commuter 3 is feeling lonely. Similarly, Commuter 3 is notified that Commuter 1 is sharing the same route until Station 11 and that Commuter 1 is open to chat. Commuter 2 is not notified of the interests and presence of Commuter 1 and Commuter 3.

When the bus is in proximity of Commuters 1, 2 and 3. The bus and bus driver receive the notification that there are three commuters to pick up from Station 5. The three commuters receive the notification that this is San Diego Bus services route 182 that will pick them from Station5 to their respective destinations. The algorithm tags Commuters 1, 2 and 3 as present in proximity of bus driver Johnny Smith.

Based on the short-range signal measurements as well as pedometer and accelerometers sensors data, Commuters 1, 2, and 3 are tagged as present in the bus route 182 for the duration of their travel.

FIG. 24 is a drawing illustrating interaction between a communication device associated with a user and a communication device associated with an object, according to some embodiments of the present invention.

One example of indoor commercial use case human-to-object communication is when system users are present in the same restaurant, pub or event. An example is a waiter and smart coasters; a smart coaster has the capability of measuring the weight/pressure performed by the glass and its fluid content or the thickness/height/threshold of the fluid in the glass.

The waiter has stored in his user profile the following interests:

Drink Status—Empty—Restaurant Tables 7, 8, and 12

Drink Status—Idle for more than 30 minutes—All Restaurant Tables

The smart coaster 1 has user sensor updates with the following status:

Drink Status—Empty—Table 10

Drink Status—Idle for more than 30 minutes—Table 10

The smart coaster 2 has user sensor updates with the following status:

Drink Status—Half full—Table 8

Drink Status—Idle for more than 5 minutes—Table 8

The smart coaster 3 has user sensor updates with the following status:

Drink Status—Empty—Table 12

Drink Status—Idle for more than 30 minutes—Table 12

Through an analysis of the user and sensor data, it is decided not to send any notification to the waiter while in proximity of tables 10 and 8. The common interest between the waiter and the smart coaster 3 are matched and a notification is sent to the waiter to attend the customer with empty glass at Table 12. This increases the efficiency of the staff as well as the revenue for the restaurant owner, and surely improves the satisfaction of the customer (who served at the right time).

Figure 25:
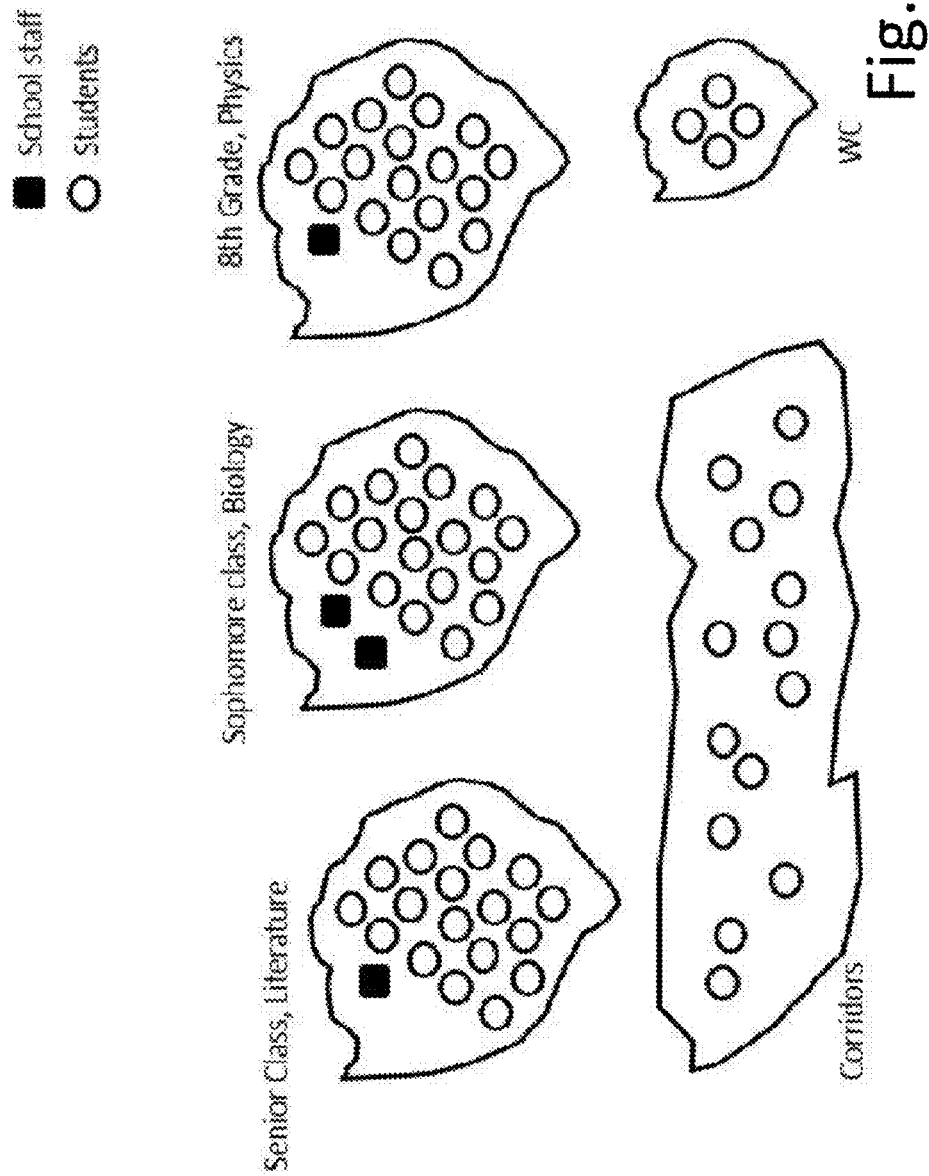
FIG. 25 is a drawings illustrating a system including first communication devices associated with school staff and second communication devices associated with the school's students, such that the second communication devices are located according to proximity to the first communication devices, according to some embodiments of the present invention.
Figure 26:
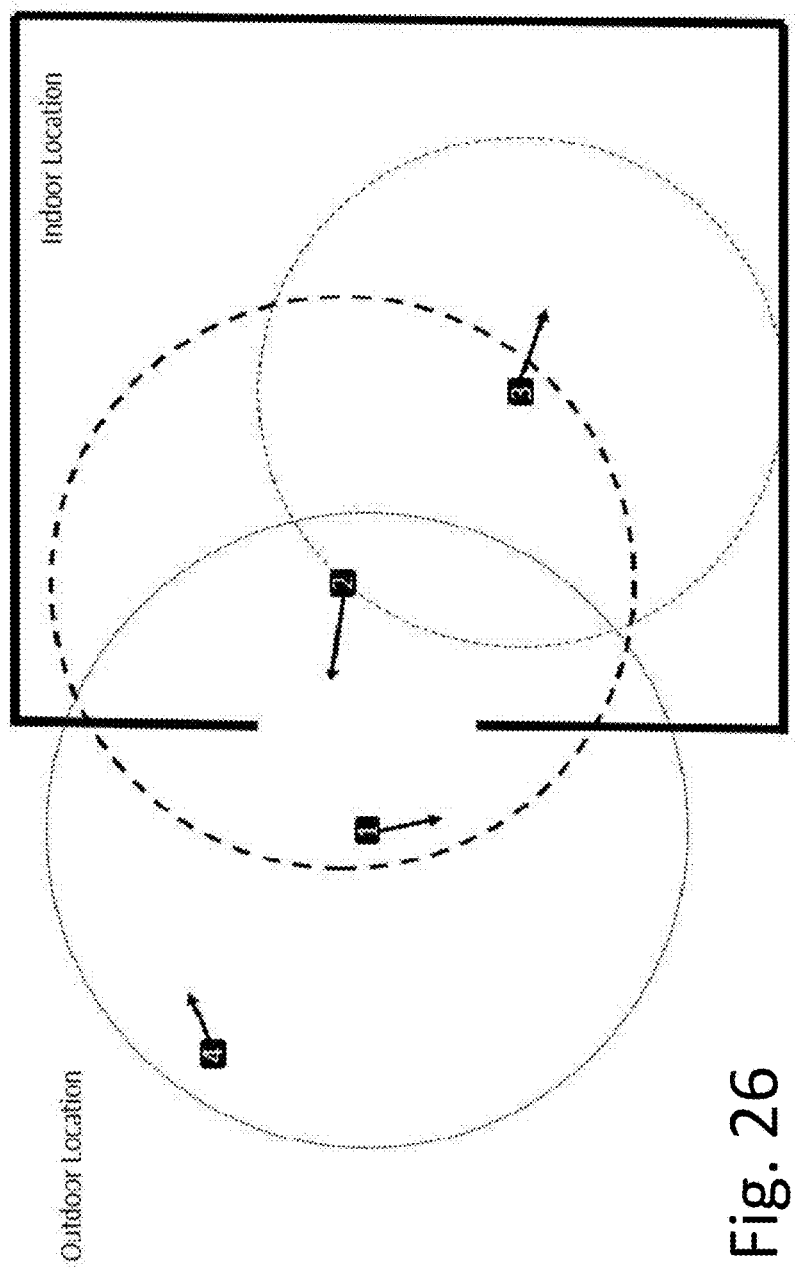
FIGS. 26-29 are drawings illustrating a system for locating communication devices that can be moved between an enclosed location and the outside of the enclosed location, according to some embodiments of the present invention.
Figure 27:
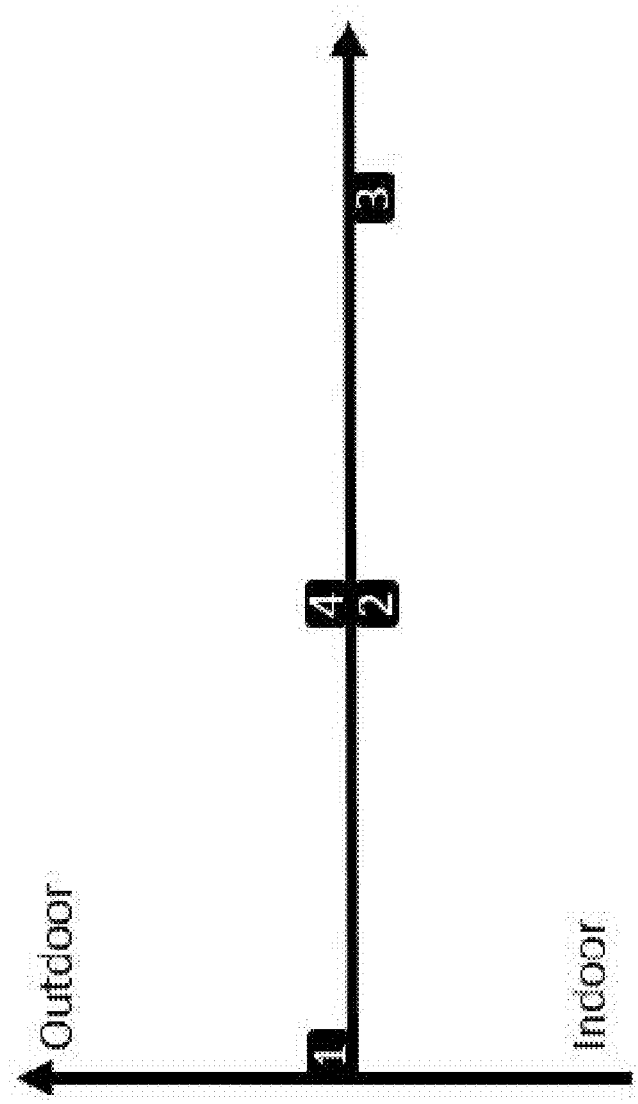
Figure 28:
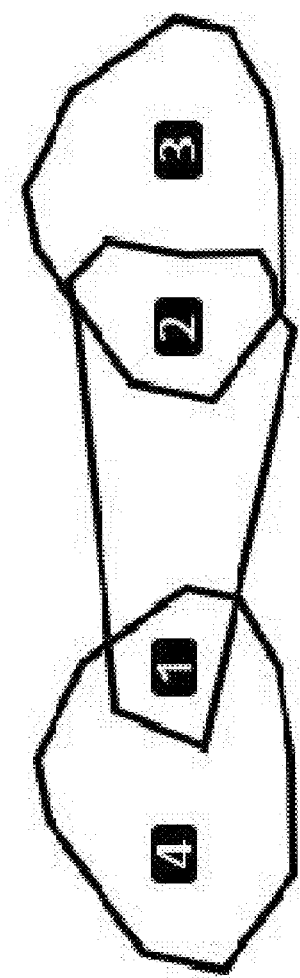
Figure 29:
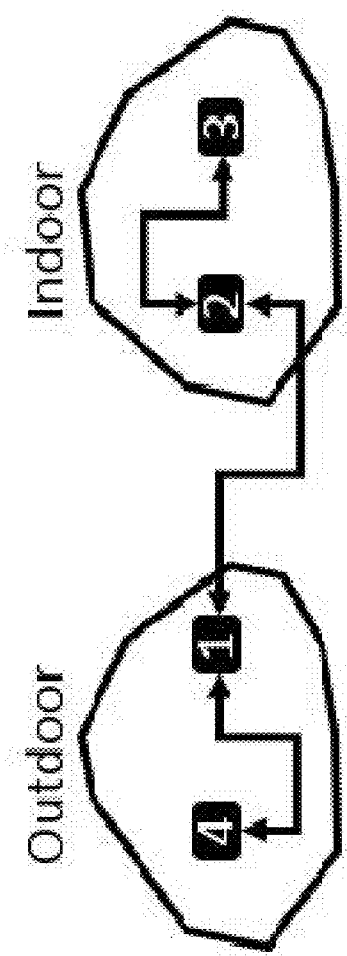

FIG. 25 is a drawing illustrating a system including first communication devices associated with school staff and second communication devices associated with the school's students, such that the second communication devices are located according to proximity to the first communication devices, according to some embodiments of the present invention.

In this example, some embodiments of the present invention are used to make sure that students are at school in the presence of teachers for most school time.

In the case of emergency (fire at school, mass shooting at school, floods, and storms, etc.) it is very important to know the location of students and if they are in the presence of adults who can guide them and protect them until help is on site (fire fighters, police, etc.). The knowledge of school staff and student's location is very important for security forces in a hostage situation, to support them in their operational plan.

When a student or a group of students are not present is the proximity of teachers or school staff for a long duration, their lack of presence is understood as absence and the system of the present invention automatically sends notification to school staff and/or parents. When a group of students are present in the proximity of a teacher for a duration of time, the system of the present invention understands that the students are attending the mentioned teacher's class session.

For example:

Teacher1 has stored in his/her user data:

New Jersey Middle School, Eighth grade, geometry, Monday to Friday, 10:00 to 11:00.

The librarian has stored in his/her user data:

New Jersey Middle School, Tuesday and Thursday, 9:00 to 15:00.

The cantina staff have stored in their user data:

New Jersey Middle School, Monday to Friday, 10:00 to 14:00.

The counselor and administrative staff have stored in their user data:

New Jersey Middle School, Monday to Friday, 9:00 to 16:00.

Twenty-Four students (1 to 24) have stored in their user data:

New Jersey Middle School, Eighth grade.

Mother18 and Father18 have stored in their user data:

Child1, Tom, New Jersey Middle School, Eighth grade;

Child2, Anna, New Jersey Elementary School, Third grade;

Based on user data and signal measurements for a certain duration, the technique of the present invention is used to determine that all the students (1 to 24) are in proximity of Teacher1. The algorithm decides that the 24 students are attending the geometry class of Teacher1. One of the students (student 18) leaves the class at 10:15 saying he needs to go to the washroom. After a certain duration, student 18 is tagged as absent from geometry class of Teacher1, and the system of the presence invention starts detecting if student 18 is in proximity of any of the other school staff.

For example, if student 18 is detected in proximity of Librarian, an automatic notification is sent to the teacher1, school staff and parents "Student 18 is with librarian, potentially at the library, while student 18 should be in geometry class".

In this short example, if student 18 is not detected in the proximity of any teachers, principal, counselor, librarian, cantina staff, administrative staff, etc., an automatic notifications sent: "Student 18 has left Teacher1 geometry class N minutes ago and he is not present in proximity of any school staff". The system then automatically starts searching if student18 is in proximity of any other students from the same school.

If this is the case, the algorithm sends automatic notification "Student 18 has left Teacher1 geometry class M minutes ago and he is not present in proximity of any school staff, but present in proximity of student 82 and student83 of Tenth grade". The technique of the present invention can detect if all three students 18, 82 and 83 are outdoor, indoor in corridors, indoor in washroom, indoor in stairways by analyzing data from other sensors. For example, by using the voice recording samples, the algorithm can detect and recognize the sound pattern of "toilet flush water" or "sink water"; by using the altimeter/barometer data, the algorithm can estimate the altitude of all three students. Thus, the notification will be updated as "Student 18 has left Teacher1 geometry class K minutes ago and he is not present in proximity of any school staff, but present in proximity of student 82 and student 83 of Tenth grade in the washroom at 3rd floor".

Over time, a deep learning technique of the present invention can detect mobility and behavior pattern of students at school in the presence of teachers, other school staff as well as classmates and students of other classes. Meaningful insights can be generated for Ministry of Education, School Staff, for students as well as parents of student. Example of such insights may include: attendance/absence from class sessions (daily, weekly, yearly etc.), time spent in each class, time spent with classmates, time spent with teacher, time spent in lab, time spent on break, time spent in cantina/restaurant, time spent alone, mobility within school, count of steps, count of out of class status during a school day (a week, a year, etc.), time when student is located in a bus, time when student is located in bus with a bus driver presence or absence, duration for which student location is unknown, etc.

User data, sensor data, and signal data are gathered continuously over time. Online or offline data can be used to model the groups of students and school staff for any past time (or history) or real time (current). An example snapshot of a school at a time Tn is shown in FIG. 25.

FIGS. 26-29 are drawings illustrating a system for locating communication devices that can be moved between an enclosed location and the outside of the enclosed location, according to some embodiments of the present invention.

As mentioned in the description of devices 11 and 21, the capability of GNSS/GPS for the communication devices is optional. In this example, a scenario is explored, where: one or multiple devices are equipped with GNSS/GPS whereas other devices in proximity are not equipped with GNSS/GPS capabilities; and one or multiple devices are equipped with GNSS/GPS whereas other devices in proximity are equipped with GNSS/GPS capabilities but not able to use it due to being in indoor location.

User 1 has a device with GPS/GNSS capabilities and is in an outdoor location with coordinates (X1, Y1).

User 4 has a device that does not have GPS/GNSS capabilities and is in an outdoor location.

User 2 has a device that does not have GPS/GNSS capabilities and is in an indoor location.

User 3 has a device that has GPS/GNSS capabilities and is in an indoor location.

The system of the present invention will tag user 2 to in proximity of user 1 and has a potential logical location of (X2, Y2) where (X2, Y2) is in the range D1 of (X1, Y1).

Similarly, user 3 is tagged in logical location (X3, Y3) in the range D2 of (X2, Y2), D1+D2 from (X1, Y1).

Similarly, user 4 is tagged in logical location (X4, Y4) in the range D1 of (X1, Y1).

As a result, users 1, 2, 3, and 4 are grouped in the same cluster for axis with relative origin of (X1, Y1).

With additional sensor data (such as audio recording or light sensing), the technique of the present invention can be used tag user 1 and 4 as being in outdoor location and users 2 and 3 as being in indoor location.

Similarly, the position of user 1 may be given by cellular 3GPP networks (2G, 3G, 4G, 5G, for example) or other positioning systems. The location of users 2, 3, and 4 can be deduced by the knowledge of the position of user 1.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A system for location estimation of communication devices, the system comprising:
 a plurality of communication devices associated with respective users, each communication device being configured to:
  store a unique user identifier of the respective user;
  store a unique device identifier of the device;
  connect to an internet through a wireless communication network;

emit first short range signals, receive second short range signals emitted by the other communication devices located within a communication range, and measure at least one property of the received second short range signals to generate signal data;

receive sensor data from one or more sensors associated with the communication device;

a computing server configured to:

connect to the internet;

store user data sets, each user data set corresponding to a respective one of the user identifiers;

communicate with at least some of the communication devices via the internet;

process the user data, the sensor data, and the signal data received by one or more of the communication devices, in order to estimate a location of at least one of the communication devices;

wherein:

first locations of one or more first communication devices from the plurality of communication devices are known at a first time, and each first location is stored in a respective first communication device and/or in the computing server;

second locations of one or more second communication devices from the plurality of communication devices are not known at the first time;

when at least one of the second communication devices is inside the communication range of one or more of the first communication devices at the first time, the signal data is sent to the server by the at least one of second communication devices and/or by the one or more first communication devices, and the server is configured for identifying the one or more first communication devices and the at least one second communication device, and for processing the first locations of the one or more first communication devices, in order to determine the second location of the at least one of the first communication device;

when any of the signal data, the user data, and the sensor data corresponding to the at least one second communication device and/or to the one or more first communication devices has changed by a respective threshold at a second time following the first time, the computing server is configured for re-processing the user data, the sensor data, and the signal data received by the first and/or second communication device in order to update at least one of the locations of the first and/or second communication devices.

2. The system of claim 1, wherein at least one of the communication devices is configured for outputting a notification to the respective user, in response to a condition determined by the server's processing of the user data, signal data, and sensor data of the at least one of the communication devices and/or of one or more others of the communication devices.

3. The system of claim 1, wherein at least one of the communication devices is configured for outputting a notification to the respective user, in response to proximity of the at least one of the communication devices.

4. The system of claim 1, wherein:

the user data comprises one or more user interests;

the server is configured for processing user data from at least two of the communication devices that are within each other's communication ranges by comparing the user interests; and at least one of the at least two of the communication devices is configured for outputting a notification to the respective user, if one or more user interests match.

5. The system of claim 1, wherein:

the server is configured to store any of:

archived and present signal data corresponding to at least one of the communication devices;

archived and present user data corresponding to at least one of the communication devices;

archived and present sensor data corresponding to at least one of the communication devices;

archived and present estimated logical user location corresponding to at least one of the communication devices;

individual device mobility patterns corresponding to at least one of the communication devices; and mobility patterns of a group of devices which comprises the at least one of the communication devices; and sequence of events causing the at least one of the communication devices to be present in a defined logical location;

and the server is configured to estimate a future logical location of at least one of the communication devices by processing any of:

archived and present signal data corresponding to at least one of the communication devices;

archived and present user data corresponding to at least one of the communication devices;

archived and present sensor data corresponding to at least one of the communication devices;

archived and present estimated logical user location corresponding to at least one of the communication devices;

individual device mobility patterns corresponding to at least one of the communication devices; and mobility patterns of a group of devices which comprises the at least one of the communication devices; and sequence of events leading for a device being present in a defined logical location.

6. The system of claim 2, wherein:

one of the communication devices is a smart coaster having a sensor configured for sensing a pressure applied by a cup placed on top of the smart coaster;

another one of the communication devices is configured for being carried by a waiter, the user data associated with the waiter comprising an interest regarding a level of fullness of cups at different tables;

the sensor data from the smart coaster comprises data indicative of the level of fullness of the cup located on the smart coaster;

the user data of the smart coaster comprising an identifier of a table on which the smart coaster is located;

the server is configured for notifying the waiter's communication device, if the level of fullness of the cup placed upon the smart coaster and the identifier of the table on which the smart coaster are located match the level of fullness and table identifier comprised in the waiter's user data.

7. A method for location estimation of communication devices, the method comprising:

providing one or more first communication devices associated with respective first users and having first known locations;

providing one or more second communication devices associated with respective second users and having unknown locations;

providing a server configured for storing one or more first sets of first user data associated with the respective one or more first users and one or more sets of second user data associated with the respective second users;

at each of the first communication devices:
  receiving one or more first short range signals from any second communication device located within a first short range communication range of the first communication device;
  measuring at least one property of the one or more received first short range signals to generate one or more respective first signal data sets;
  receiving first sensor data from one or more first sensors in communication with the first communication device;

at each of the second communication devices:
  receiving one or more second short range signals from any first communication device located within a second short range communication range of the second communication device;
  measuring at least one property of the one or more received second short range signals to generate one or more respective second signal data sets;
  receiving second sensor data from one or more second sensors in communication with the second communication device;

at the server:
  receiving the one or more first signal data sets from each first communication device and/or the one or more second signal data sets from each second communication device;
  processing the first signal data sets to identify the first communication devices and/or processing the second signal data sets to identify the second communication device;
  determining the location for each second communication device, by processing the one or more first locations of the one or more first communication devices within the second communication range;
  receiving the first sensor data, the second sensor data, the one or more first signal data sets, and the one or more second signal data sets at a predetermined frequency;
  when any one of the first signal data sets, the first sensor data, the first user data, the second signal data sets, the second sensor data, and the second user data has changed by a respective threshold, processing the first signal data sets, the first sensor data, the first user data, the second signal data sets, the second sensor data, and the second user data to determine the locations of the first and/or second communication devices.

8. The method of claim 7, further comprising communicating to the first and/or second communication devices data indicative of the respective locations by the server.

9. The method of claim 7, further comprising:
at the server:
  determining whether a predetermined condition for at least one of the communication devices is fulfilled, by processing the user data, the signal data, and the sensor data, corresponding to at least one of the communication devices;
  if the predetermined condition is fulfilled, generating one or more data pieces indicative of one or more notifications for respective communication devices;
  communicating each data piece to the respective communication device;
at each communication device:
  receiving the respective data piece;
  outputting a notification to the respective user, in response to the respective data piece.

10. The method of claim 7, comprising:
at the server:
  determining whether at least two of the communication devices are within each other's short signal ranges, by processing the signal data corresponding to at least two of the communication devices;
  generating one or more data pieces indicative of one or more notifications for respective communication devices that are within each other's short signal ranges;
  communicating each data piece to the respective communication device;
at each communication device:
  receiving the respective data piece;
  outputting a notification to the respective user, in response to the respective data piece.

11. A system for location estimation of communication devices, the system comprising:
a plurality of communication devices associated with respective users, each communication device being configured to:
  store a unique user identifier of the respective user;
  store a unique device identifier of the device;
  emit first short range signals, receive second short range signals emitted by the other communication devices located within a communication range, and measure at least one property of the received second short range signals to generate signal data;
  receive sensor data from one or more sensors associated with the communication device;
  store one or more user data sets, each user data set corresponding to a respective one of the user identifiers;
  process the user data, the sensor data, and the signal data received by one or more of the communication devices, in order to estimate a location of at least one of the communication devices;
wherein:
  first locations of one or more first communication devices from the plurality of communication devices are known at a first time, and each first location is stored in a respective first communication device;
  second locations of one or more second communication devices from the plurality of communication devices are not known at the first time;
  when at least one of the second communication devices is inside the communication range of one or more of the first communication devices at the first time, the signal data is processed by the at least one of the second communication devices, such that and the first locations of the one or more first communication devices are processed by the at least one of the first communication devices, in order to determine the second location of the at least one of the first communication device;
  when any of the signal data, the user data, and the sensor data corresponding to the at least one second communication device and/or to the one or more first communication devices has changed by a respective threshold at a second time following the first time, each communication device is configured for re-processing the user data, the sensor data, and the signal data received by the first and/or second communication device in order to update at least one of the locations of the first and/or second communication devices.

* * * * *